United States Patent
Chinchwadkar et al.

(10) Patent No.: US 8,290,977 B2
(45) Date of Patent: Oct. 16, 2012

(54) DATABASE SYSTEM PROVIDING METHODOLOGY FOR EXECUTION OF FUNCTIONS IN XML QUERIES

(75) Inventors: Gajanan S. Chinchwadkar, Fremont, CA (US); Anupam Singh, Dublin, CA (US); Srikanth Sampath, Fremont, CA (US); Phil Shaw, Huntington Beach, CA (US)

(73) Assignee: Sybase Inc., Dublin, CA (US)

( * ) Notice: Subject to any disclaimer, the term of this patent is extended or adjusted under 35 U.S.C. 154(b) by 1242 days.

(21) Appl. No.: 10/904,055

(22) Filed: Oct. 21, 2004

(65) Prior Publication Data
US 2006/0100989 A1    May 11, 2006

(51) Int. Cl.
G06F 7/00    (2006.01)
(52) U.S. Cl. ........................................ 707/778
(58) Field of Classification Search ............. 707/4, 101, 707/778
See application file for complete search history.

(56) References Cited

U.S. PATENT DOCUMENTS

| | | | | |
|---|---|---|---|---|
| 6,356,906 B1 | 3/2002 | Lippert et al. | | 707/10 |
| 6,397,219 B2 | 5/2002 | Mills | | 707/10 |
| 6,466,940 B1 | 10/2002 | Mills | | 707/102 |
| 6,480,860 B1 | 11/2002 | Monday | | 707/102 |
| 6,510,434 B1 | 1/2003 | Anderson et al. | | 707/100 |
| 6,549,922 B1 | 4/2003 | Srivastava et al. | | 707/205 |
| 6,587,855 B1 | 7/2003 | Ellmann et al. | | 707/10 |
| 6,604,100 B1 | 8/2003 | Fernandez et al. | | 707/3 |
| 6,622,144 B1 | 9/2003 | Rush | | 707/101 |
| 6,631,379 B2 | 10/2003 | Cox | | 707/100 |
| 6,631,519 B1 | 10/2003 | Nicholson et al. | | 717/169 |
| 6,635,089 B1 | 10/2003 | Burkett et al. | | 715/513 |
| 6,636,845 B2 | 10/2003 | Chau et al. | | 707/1 |
| 6,643,633 B2 | 11/2003 | Chau et al. | | 707/1 |
| 6,799,184 B2 | 9/2004 | Bhatt et al. | | 707/102 |
| 7,016,910 B2* | 3/2006 | Egilsson et al. | | 707/101 |
| 7,120,645 B2* | 10/2006 | Manikutty et al. | | 707/102 |
| 2004/0003341 A1* | 1/2004 | alSafadi et al. | | 715/500 |
| 2004/0060007 A1* | 3/2004 | Gottlob et al. | | 715/513 |
| 2005/0060647 A1* | 3/2005 | Doan et al. | | 715/514 |
| 2005/0187947 A1* | 8/2005 | Wortendyke et al. | | 707/100 |
| 2005/0228768 A1* | 10/2005 | Thusoo et al. | | 707/1 |
| 2005/0228792 A1* | 10/2005 | Chandrasekaran et al. | | 707/9 |
| 2006/0074930 A1* | 4/2006 | Hsu et al. | | 707/100 |

\* cited by examiner

*Primary Examiner* — Amy Ng
(74) *Attorney, Agent, or Firm* — Sterne, Kessler, Goldstein and Fox P.L.L.C.

(57) ABSTRACT

A database system providing methodology for execution of functions in queries requesting data from markup language documents is described. In one embodiment, for example, a method is described for executing a function in a query requesting data from a markup language document stored in a database, the markup language document organized hierarchically into nodes, the method comprises steps of: receiving the query requesting data from the markup language document, the query including a function to be executed during execution of the query; determining nodes of the markup language document satisfying the query; deriving values of the nodes of the markup language document; and executing the function with the derived values and the nodes of the markup language document.

90 Claims, 11 Drawing Sheets

DATABASE SYSTEM PROVIDING METHODOLOGY FOR EXECUTION OF FUNCTIONS IN XML QUERIES

COPYRIGHT STATEMENT

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

APPENDIX DATA

Computer Program Listing Appendix under Sec. 1.52(e): This application includes a transmittal under 37 C.F.R. Sec. 1.52(e) of a Computer Program Listing Appendix. The Appendix, which comprises text file(s) that are IBM-PC machine and Microsoft Windows Operating System compatible, includes the below-listed file(s). All of the material disclosed in the Computer Program Listing Appendix can be found at the U.S. Patent and Trademark Office archives and is hereby incorporated by reference into the present application.

Object Description: SourceCode.txt, size: 30,585 Bytes, created: 10/19/2004 2:22 PM; Object ID: File No. 1; Object Contents: Source code.

BACKGROUND OF INVENTION

1. Field of the Invention

The present invention relates generally to data processing environments and, more particularly, to a database system providing methodology for execution of functions in queries requesting data from markup language documents.

2. Description of the Background Art

Computers are very powerful tools for storing and providing access to vast amounts of information. Computer databases are a common mechanism for storing information on computer systems while providing easy access to users. A typical database is an organized collection of related information stored as "records" having "fields" of information. As an example, a database of employees may have a record for each employee where each record contains fields designating specifics about the employee, such as name, home address, salary, and the like.

Between the actual physical database itself (i.e., the data actually stored on a storage device) and the users of the system, a database management system or DBMS is typically provided as a software cushion or layer. In essence, the DBMS shields the database user from knowing or even caring about the underlying hardware-level details. Typically, all requests from users for access to the data are processed by the DBMS. For example, information may be added or removed from data files, information retrieved from or updated in such files, and so forth, all without user knowledge of the underlying system implementation. In this manner, the DBMS provides users with a conceptual view of the database that is removed from the hardware level. The general construction and operation of database management systems is well known in the art. See e.g., Date, C., "An Introduction to Database Systems, Seventh Edition", Part I (especially, Chapters 1-4), Addison Wesley, 2000.

In recent years, applications running on database systems frequently provide for business-to-business or business-to-consumer interaction via the Internet between the organization hosting the application and its business partners and customers. Today, many organizations receive and transmit considerable quantities of information to business partners and customers through the Internet. A considerable portion of the information received or exchanged is in Extensible Markup Language or "XML" format. XML is a pared-down version of SGML (Standard Generalized Markup Language), designed especially for Web documents, which allows designers to create their own customized tags, enabling the definition, transmission, validation, and interpretation of data between applications and between organizations. For further description of XML, see e.g., "Extensible Markup Language (XML) 1.0" (Second Edition, Oct. 6, 2000) a recommended specification from the W3C, the disclosure of which is hereby incorporated by reference. A copy of this specification is available via the Internet (e.g., currently at www.w3.org/TR/2000/REC-xml-20001006). Many organizations utilize XML to exchange data with other remote users over the Internet.

Given the increasing use of XML in recent years, many organizations now have considerable quantities of data in XML format, including Web documents, newspaper articles, product catalogs, purchase orders, invoices, and product plans. As a result, these organizations need to be able to efficiently store, maintain, and use this XML information in an efficient manner. However, this XML data is not in a format that can be easily stored and searched in current database systems. Most XML data is sent and stored in plain text format. This data is not formatted in tables and rows like information stored in a relational DBMS. To search this semi-structured data, users typically utilize keyword searches similar to those utilized by many current Internet search engines. These keyword searches are resource-intensive and are not as efficient as relational DBMS searches of structured data.

Organizations with data in XML format also typically have other enterprise data stored in a structured format in database management systems. Increasingly, database system users are demanding that database systems provide the ability to access and use both structured data stored in these databases as well as XML and other unstructured or semi-structured data. In addition, users desire flexible tools and facilities for performing searches of this data.

One of the key roles of a database management system (DBMS) is to retrieve data stored in a database based on specified selection criterion. This typically involves retrieving data in response to a query that is specified in a query language. One particular need is for a solution that will enable efficient searches of information in XML documents. For instance, it would be desirable to have an XML version of SQL (Structured Query Language) that would enable a user to easily retrieve all nodes of type X that have descendants of type Y from an XML document.

One current solution used in XML-based applications to query the contents of an XML document is XPath. The XPath query language is commonly used in Extensible Stylesheet Language Transformations (XSLT) to locate and to apply XSLT templates to specific nodes in an XML document. XPath queries are also commonly used to locate and to process nodes in an XML document that match a specified criteria. XPath provides basic facilities for manipulation of strings, numbers and booleans. It uses a compact, non-XML syntax to facilitate use of XPath within URIs and XML attribute values. XPath operates on the abstract, logical structure of an XML document, rather than its surface syntax. XPath gets its name from its use of a path notation as in URLs for navigating through the hierarchical structure of an XML document. For further description of XPath, see e.g., "XML Path Language (XPath) Version 1.0" (Nov. 16, 1999), a recommended specification from the W3C, the disclosure of which is hereby incorporated by reference. A copy of this specification is available via the Internet (e.g., currently at www.w3c.org/TR/xpath).

Although XPath provides a mechanism for locating nodes in an XML document that match specified criteria, problems remain in the processing of queries written in the XPath query language in current database systems. One particular problem is that data in XML documents is typically spread in various places throughout the document. For example, in an XML document containing records of books in a bookstore, the names of authors in the book will typically not be consolidated in one location, but rather will be spread throughout the document. Accordingly, performing a search to find a particular author name may require traversing paths of the XML document structure to locate nodes containing the author name and then comparing the author name at a given node to the desired valued.

Another problem is that the data in an XML document may be in different forms. For instance, one publisher of books may use all upper-case letters for author names (e.g., "JOHN"), while another publisher uses a "first-letter capitalized" style (e.g., "John"). If a user wants to find all the books in which the author's first name is John, this query needs a union of the results of a first search performed for authors with first-name="JOHN" and a second search with first-name="John". However, a case-free comparison may be possible using string functions such as "tolower( )" or "toupper( )". The use of functions such as tolower( ) and toupper( ) make it possible to perform string comparisons more efficiently. Recently, efforts have been initiated to provide for use of certain built-in functions within XPath queries. A set of functions for use within path-based queries (e.g., XPath queries) has been proposed in "XQuery 1.0 and XPath 2.0 Functions and Operators", a World Wide Web Consortium (W3C) Working Draft dated Jul. 23, 2004, the disclosure of which is hereby incorporated by reference. A copy of this document is available via the Internet (e.g., currently at www.w3.org/TR/xpath-functions/). However, database solutions currently do not include mechanisms for using functions such as the above-described string functions in XPath queries. Some current DBMS solutions provide the ability to store XML data in a database system and to retrieve this data using XPath queries. However, these solutions currently do not support inclusion of these types of functions in XPath queries.

What is needed is a database system with built-in support for functions in queries (e.g., XPath queries) requesting data in XML format. The solution should enable a function to be included anywhere within a query expression. The solution should also enable information to be consolidated from various portions of an XML document as a query is executed. The present invention provides a solution for these and other needs.

SUMMARY OF INVENTION

A database system providing methodology for execution of functions in queries requesting data from markup language documents is described. In one embodiment, for example, a method of the present invention is described for executing a function in a query requesting data from a markup language document stored in a database, the markup language document organized hierarchically into nodes, the method comprises steps of: receiving the query requesting data from the markup language document, the query including a function to be executed during execution of the query; determining nodes of the markup language document satisfying the query; deriving values of the nodes of the markup language document; and executing the function with the derived values and the nodes of the markup language document.

In another embodiment, for example, a system of the present invention for executing a function included in a query requesting data from a markup language document stored in a database, the markup language document organized hierarchically into nodes is described that comprises: a compiler module for generating a plan for identifying nodes of the markup language document satisfying the query; and an execution module for executing the plan to identify nodes of the markup language document satisfying the query, obtaining values corresponding to identified nodes of the markup language document, associating the values with the identified nodes, and executing the function included in the query with the values and identified nodes.

In yet another embodiment, for example, in a database system, a method of the present invention is described for executing a function in a query requesting data from an Extensible Markup Language (XML) document, the method comprises steps of: receiving the query requesting data from an XML document, the query including a function to be executed on data from an XML document which includes a plurality of hierarchically arranged elements; determining elements of the XML document satisfying the query; obtaining values of the elements of the XML document; associating the values with elements of the XML document; and executing the function with the values and associated elements.

In another embodiment, for example, in a database system, a method of the present invention is described for executing a function included in a query requesting data from an XML document organized hierarchically into nodes, the method comprises steps of: generating an execution plan for obtaining data requested by the query from an XML document, the execution plan including an operator for performing the function included in the query; inserting an operator for obtaining values corresponding to nodes of the XML document into the execution plan; identifying nodes of the XML document satisfying the query based on the execution plan; deriving values from identified nodes of the XML document using the operator for obtaining values; and invoking the operator for performing the function with the values derived from the identified nodes of the XML document.

DETAILED DESCRIPTION

Glossary

Figure 1:
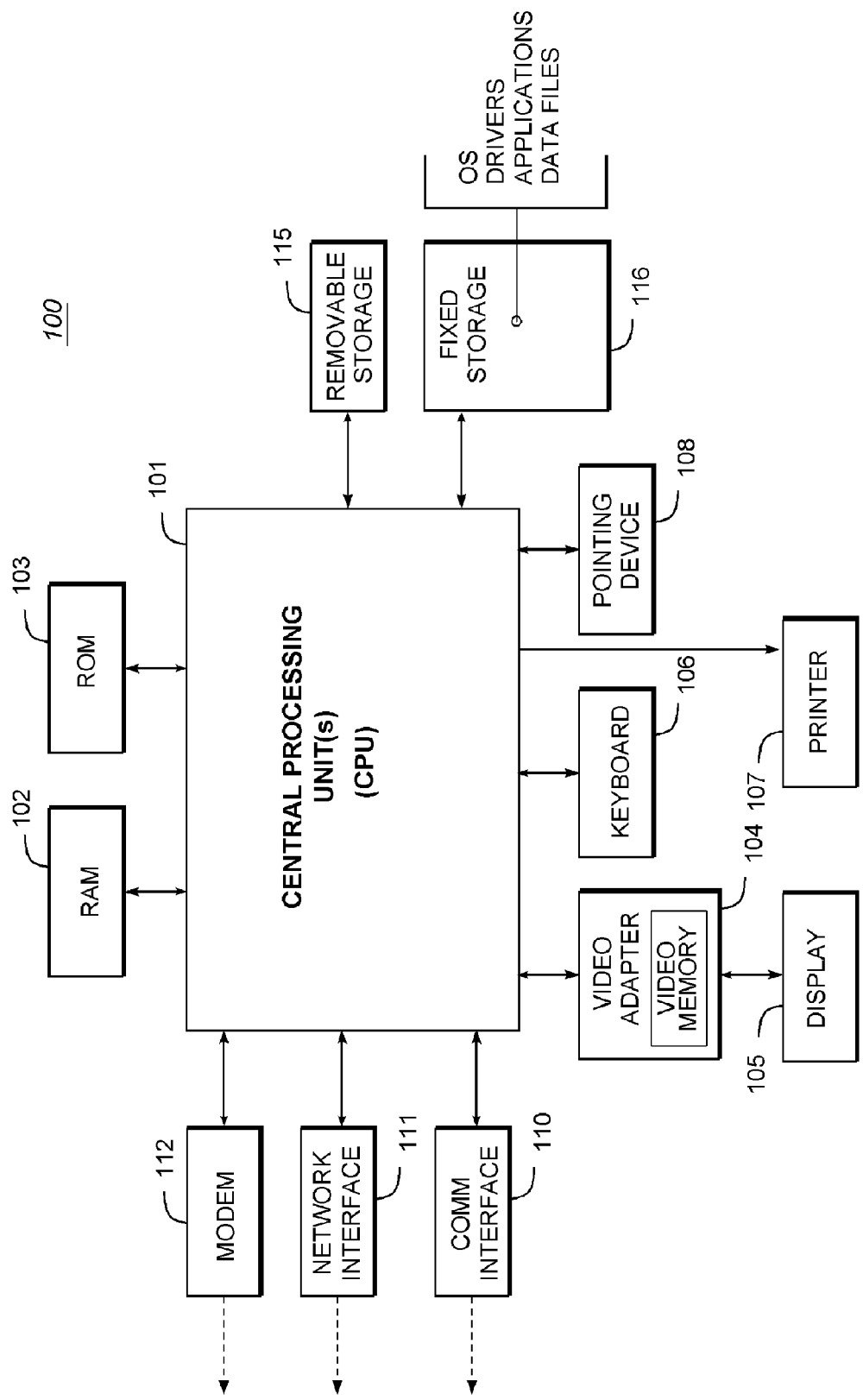
FIG. 1 is a very general block diagram of a computer system (e.g., an IBM-compatible system) in which software-implemented processes of the present invention may be embodied.

The following definitions are offered for purposes of illustration, not limitation, in order to assist with understanding the discussion that follows.

HTML: HTML stands for HyperText Markup Language, the authoring language used to create documents on the World Wide Web. HTML defines the structure and layout of a Web document by using a variety of tags and attributes. For further description of HTML, see e.g., "HTML 4.01 Specification", a World Wide Web consortium recommendation dated Dec. 24, 1999, the disclosure of which is hereby incorporated by reference. A copy of this specification is available via the Internet (e.g., currently at www.w3.org/TR/REC-html40).

Node: In the context of a markup language document (e.g., an XML document), a node corresponds to an element or value in the markup language document. Unlike conventional data in a database (e.g., relational database) which is maintained in a flat structure, information in a markup language document (e.g., XML document) can be represented as a tree structure. The tree structure of an XML document is generated by transforming each element or value in the XML document into a node in the tree.

Path scan: A path scan returns identifiers of all the nodes that follow a given XPath. In the system of the present invention, a path scan invokes services of a store layer.

Physical query operator (operator): One step in an execution plan is called an operator. Since it is in the plan (i.e., interpretable by the execution engine) it is called the "physical" operator.

Query: A request for information from a database. A database query is typically written in a database query language, which is a language enabling database users to interactively formulate requests and generate reports. One of the best known query languages is the Structured Query Language (SQL).

Query engine: A query engine is a significant component of a DBMS, which in the currently preferred embodiment of the present invention is comprised of the following sub-components: a parser, a normalization engine, an optimizer/compiler, and an execution engine. The parser converts query text to a query tree and imposes syntactic correctness. The normalization engine enforces semantic correctness by validating the correctness of information in the query. It also transforms the query into an operator tree or query that is in a form which facilitates processing by other sub-components of the query engine. An optimizer chooses the best among various alternative plans for executing a query. A compiler generates another structure that enumerates the specific execution steps in the appropriate order of execution. In this document the XML engine optimizer and compiler are together referred to as the optimizer, unless otherwise indicated. The last sub-component of the query engine is the execution engine which is a virtual machine within a DBMS that interprets the "plan language". The execution engine executes all the sub-commands necessary to execute the query and return results.

Query plan: A query plan (execution plan or "plan") is an in-memory data-structure which contains the specific steps (operations) and order of execution for a given query. A query plan is written in a language that the execution engine understands.

Query processing: All phases of query evaluation parsing, normalization, optimization/compilation, execution, and result generation together are termed as "query processing". The life of a query includes all of these phases.

Query tree: A query tree is an in-memory data-structure which represents a query. Initially, it is a mirror of "query text" in the form of an in-memory data-structure. It includes the same information as in the user query.

Relational database: A relational database is a collection of data items organized as a set of formally-described tables from which data can be accessed or reassembled in many different ways without having to reorganize the database tables. The relational database was invented by E. F. Codd at IBM in 1970. A relational database employs a set of tables containing data fitted into predefined categories. Each table (which is sometimes called a relation) contains one or more data categories in columns. The standard user and application program interface to a relational database is the structured query language (SQL), defined below.

SQL: SQL stands for Structured Query Language. The original version called SEQUEL (structured English query language) was designed by IBM in the 1970's. SQL-92 (or SQL/92) is the formal standard for SQL as set out in a document published by the American National Standards Institute in 1992; see e.g., "Information Technology—Database languages—SQL", published by the American National Standards Institute as American National Standard ANSI/ISO/IEC 9075: 1992, the disclosure of which is hereby incorporated by reference. SQL-92 was superseded by SQL-99 (or SQL3) in 1999; see e.g., "Information Technology—Database Languages—SQL, Parts 1-5" published by the American National Standards Institute as American National Standard INCITS/ISO/IEC 9075-(1-5)-1999 (formerly ANSI/ISO/IEC 9075-(1-5) 1999), the disclosure of which is hereby incorporated by reference.

Storage layer: A storage layer is a component of a DBMS which provides services to the query engine such as running a scan and extracting data from disk to in-memory buffers, storing data from in-memory buffers to disk, and so forth.

URL: URL is an abbreviation of Uniform Resource Locator, the global address of documents and other resources on the World Wide Web. The first part of the address indicates what protocol to use, and the second part specifies the IP address or the domain name where the resource is located.

XML: XML stands for Extensible Markup Language, a specification developed by the World Wide Web Consortium (W3C). XML is a pared-down version of the Standard Generalized Markup Language (SGML), a system for organizing and tagging elements of a document. XML is designed especially for Web documents. It allows designers to create their own customized tags, enabling the definition, transmission, validation, and interpretation of data between applications and between organizations. For further description of XML, see e.g., "Extensible Markup Language (XML) 1.0 (Third Edition)", (Feb. 4, 2004) a recommended specification from the W3C, the disclosure of which is hereby incorporated by reference. A copy of this specification is available via the Internet (e.g., currently at www.w3.org/TR/2000/REC-xml-20040204).

XPath: XPath is a query language for querying data in XML documents. The XPath query language is commonly used in Extensible Stylesheet Language Transformations (XSLT) to locate and to apply XSLT templates to specific nodes in an XML document. XPath queries are also commonly used to locate and to process nodes in an XML document that match a specified criteria. XPath provides basic facilities for manipulation of strings, numbers, and booleans. It uses a compact, non-XML syntax to facilitate use of XPath within URIs and XML attribute values. XPath operates on the abstract, logical structure of an XML document, rather than its surface syntax. XPath gets its name from its use of a path notation as in URLs for navigating through the hierarchical structure of an XML document. For further description of XPath, see e.g., "XML Path Language (XPath) Version 1.0" (Nov. 16, 1999), a recommended specification from the W3C, the disclosure of which is hereby incorporated by reference. A copy of this specification is available via the Internet (e.g., currently at www.w3c.org/TR/xpath).

Introduction

Referring to the figures, exemplary embodiments of the invention will now be described. The following description will focus on the presently preferred embodiment of the present invention, which is implemented in desktop and/or server software (e.g., driver, application, or the like) operating in an Internet-connected environment running under an operating system, such as the Microsoft Windows operating system. The present invention, however, is not limited to any one particular application or any particular environment. Instead, those skilled in the art will find that the system and methods of the present invention may be advantageously embodied on a variety of different platforms, including Macintosh, Linux, Solaris, UNIX, FreeBSD, and the like. Therefore, the description of the exemplary embodiments that follows is for purposes of illustration and not limitation. The exemplary embodiments are primarily described with reference to block diagrams or flowcharts. As to the flowcharts, each block within the flowcharts represents both a method step and an apparatus element for performing the method step. Depending upon the implementation, the corresponding apparatus element may be configured in hardware, software, firmware, or combinations thereof.

Computer-Based Implementation

Basic System Hardware (e.g., For Desktop and Server Computers)

The present invention may be implemented on a conventional or general-purpose computer system, such as an IBM-compatible personal computer (PC) or server computer. FIG. 1 is a very general block diagram of a computer system (e.g., an IBM-compatible system) in which software-implemented processes of the present invention may be embodied. As shown, system 100 comprises a central processing unit(s) (CPU) or processor(s) 101 coupled to a random-access memory (RAM) 102, a read-only memory (ROM) 103, a keyboard 106, a printer 107, a pointing device 108, a display or video adapter 104 connected to a display device 105, a removable (mass) storage device 115 (e.g., floppy disk, CD-ROM, CD-R, CD-RW, DVD, or the like), a fixed (mass) storage device 116 (e.g., hard disk), a communication (COMM) port(s) or interface(s) 110, a modem 112, and a network interface card (NIC) or controller 111 (e.g., Ethernet). Although not shown separately, a real time system clock is included with the system 100, in a conventional manner.

CPU 101 comprises a processor of the Intel Pentium family of microprocessors. However, any other suitable processor may be utilized for implementing the present invention. The CPU 101 communicates with other components of the system via a bi-directional system bus (including any necessary input/output (I/O) controller circuitry and other "glue" logic). The bus, which includes address lines for addressing system memory, provides data transfer between and among the various components. Description of Pentium-class microprocessors and their instruction set, bus architecture, and control lines is available from Intel Corporation of Santa Clara, Calif. Random-access memory 102 serves as the working memory for the CPU 101. In a typical configuration, RAM of sixty-four megabytes or more is employed. More or less memory may be used without departing from the scope of the present invention. The read-only memory (ROM) 103 contains the basic input/output system code (BIOS)—a set of low-level routines in the ROM that application programs and the operating systems can use to interact with the hardware, including reading characters from the keyboard, outputting characters to printers, and so forth.

Mass storage devices 115, 116 provide persistent storage on fixed and removable media, such as magnetic, optical or magnetic-optical storage systems, flash memory, or any other available mass storage technology. The mass storage may be shared on a network, or it may be a dedicated mass storage. As shown in FIG. 1, fixed storage 116 stores a body of program and data for directing operation of the computer system, including an operating system, user application programs, driver and other support files, as well as other data files of all sorts. Typically, the fixed storage 116 serves as the main hard disk for the system.

In basic operation, program logic (including that which implements methodology of the present invention described below) is loaded from the removable storage 115 or fixed storage 116 into the main (RAM) memory 102, for execution by the CPU 101. During operation of the program logic, the system 100 accepts user input from a keyboard 106 and pointing device 108, as well as speech-based input from a voice recognition system (not shown). The keyboard 106 permits selection of application programs, entry of keyboard-based input or data, and selection and manipulation of individual data objects displayed on the screen or display device 105. Likewise, the pointing device 108, such as a mouse, track ball, pen device, or the like, permits selection and manipulation of objects on the display device. In this manner, these input devices support manual user input for any process running on the system.

The computer system 100 displays text and/or graphic images and other data on the display device 105. The video adapter 104, which is interposed between the display 105 and the system's bus, drives the display device 105. The video adapter 104, which includes video memory accessible to the CPU 101, provides circuitry that converts pixel data stored in the video memory to a raster signal suitable for use by a cathode ray tube (CRT) raster or liquid crystal display (LCD) monitor. A hard copy of the displayed information, or other information within the system 100, may be obtained from the printer 107, or other output device. Printer 107 may include, for instance, an HP Laserjet printer (available from Hewlett Packard of Palo Alto, Calif.), for creating hard copy images of output of the system.

The system itself communicates with other devices (e.g., other computers) via the network interface card (NIC) 111 connected to a network (e.g., Ethernet network, Bluetooth wireless network, or the like), and/or modem 112 (e.g., 56K baud, ISDN, DSL, or cable modem), examples of which are available from 3Com of Santa Clara, Calif. The system 100 may also communicate with local occasionally-connected devices (e.g., serial cable-linked devices) via the communication (COMM) interface 110, which may include a RS-232 serial port, a Universal Serial Bus (USB) interface, or the like. Devices that will be commonly connected locally to the interface 110 include laptop computers, handheld organizers, digital cameras, and the like.

IBM-compatible personal computers and server computers are available from a variety of vendors. Representative vendors include Dell Computers of Round Rock, Tex., Hewlett-Packard of Palo Alto, Calif., and IBM of Armonk, N.Y. Other suitable computers include Apple-compatible computers (e.g., Macintosh), which are available from Apple Computer of Cupertino, Calif., and Sun Solaris workstations, which are available from Sun Microsystems of Mountain View, Calif.

Basic System Software

Figure 2:
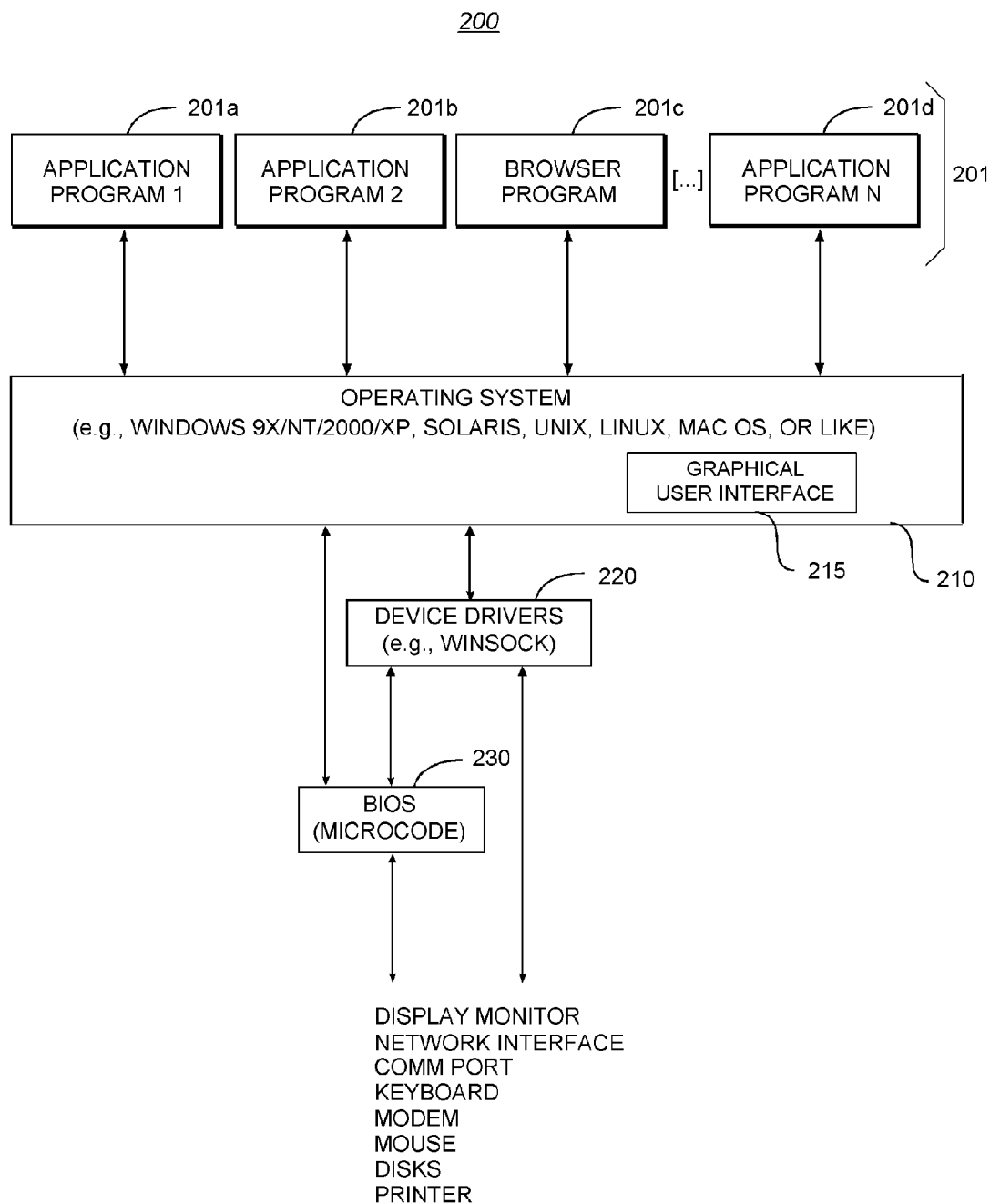
FIG. 2 is a block diagram of a software system for controlling the operation of the computer system.

FIG. 2 is a block diagram of a software system for controlling the operation of the computer system 100. As shown, a computer software system 200 is provided for directing the operation of the computer system 100. Software system 200, which is stored in system memory (RAM) 102 and on fixed storage (e.g., hard disk) 116, includes a kernel or operating system (OS) 210. The OS 210 manages low-level aspects of computer operation, including managing execution of processes, memory allocation, file input and output (I/O), and device I/O. One or more application programs, such as client application software or "programs" 201 (e.g., 201a, 201b, 201c, 201d) may be "loaded" (i.e., transferred from fixed storage 116 into memory 102) for execution by the system 100. The applications or other software intended for use on the computer system 100 may also be stored as a set of downloadable processor-executable instructions, for example, for downloading and installation from an Internet location (e.g., Web server).

Software system 200 includes a graphical user interface (GUI) 215, for receiving user commands and data in a graphical (e.g., "point-and-click") fashion. These inputs, in turn, may be acted upon by the system 100 in accordance with instructions from operating system 210, and/or client application module(s) 201. The GUI 215 also serves to display the results of operation from the OS 210 and application(s) 201, whereupon the user may supply additional inputs or terminate the session. Typically, the OS 210 operates in conjunction with device drivers 220 (e.g., "Winsock" driver—Windows' implementation of a TCP/IP stack) and the system BIOS microcode 230 (i.e., ROM-based microcode), particularly when interfacing with peripheral devices. OS 210 can be provided by a conventional operating system, such as Microsoft Windows 9x, Microsoft Windows NT, Microsoft Windows 2000, or Microsoft Windows XP, all available from Microsoft Corporation of Redmond, Wash. Alternatively, OS 210 can also be an alternative operating system, such as the previously mentioned operating systems.

Client-Server Database Management System

Figure 3:
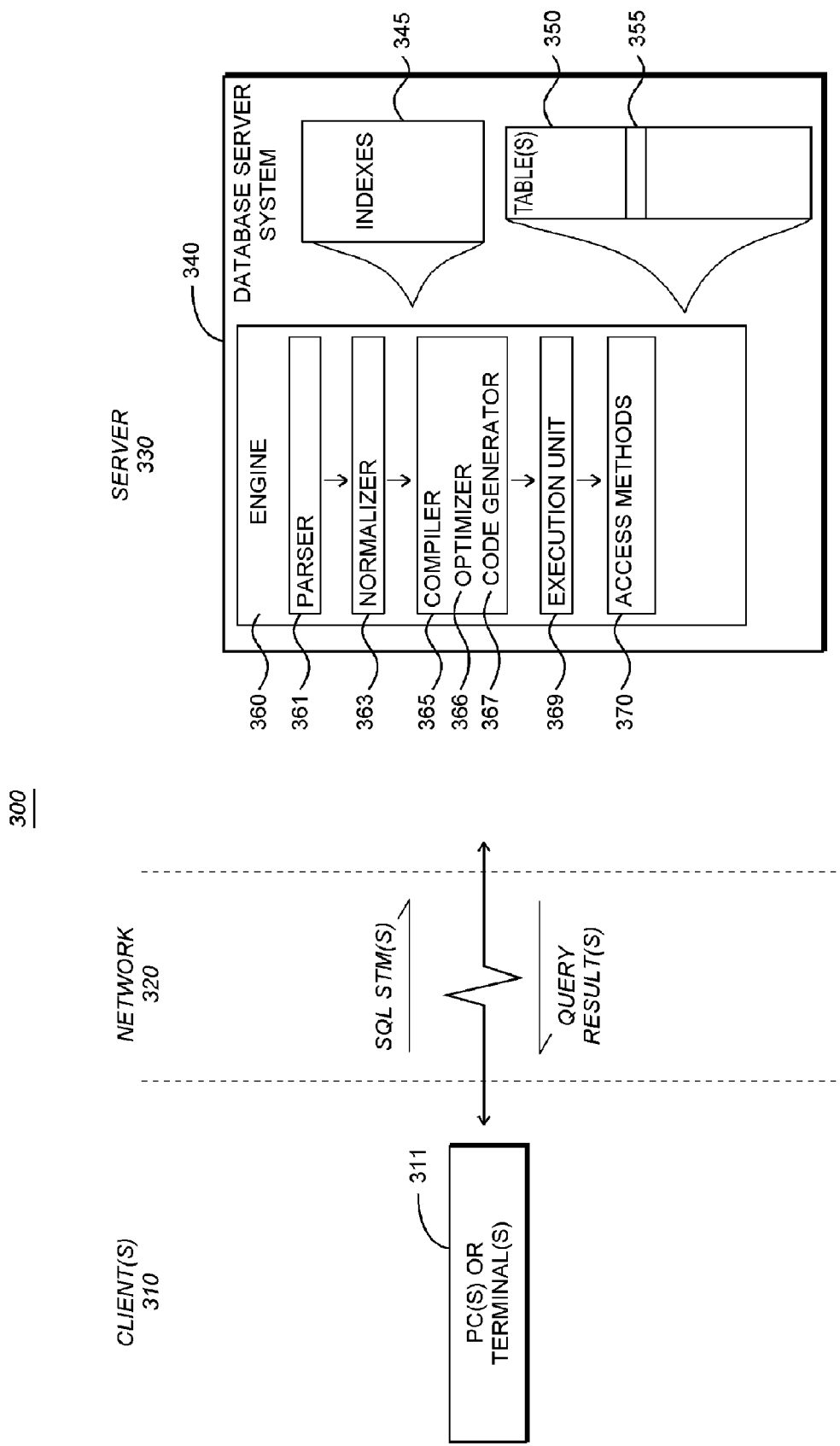
FIG. 3 illustrates the general structure of a client/server database system suitable for implementing the present invention.

While the present invention may operate within a single (standalone) computer (e.g., system 100 of FIG. 1), the present invention is preferably embodied in a multi-user computer system, such as a client/server system. FIG. 3 illustrates the general structure of a client/server database system 300 suitable for implementing the present invention. As shown, the system 300 comprises one or more client(s) 310 connected to a server 330 via a network 320. Specifically, the client(s) 310 comprise one or more standalone terminals 311 connected to a database server system 340 using a conventional network. In an exemplary embodiment, the terminals 311 may themselves comprise a plurality of standalone workstations, dumb terminals, or the like, or comprise personal computers (PCs) such as the above-described system 100. Typically, such units would operate under a client operating system, such as a Microsoft (registered trademark) Windows client operating system (e.g., Microsoft (registered trademark) Windows 95/98, Windows 2000, or Windows XP).

The database server system 340, which comprises Sybase (registered trademark) Adaptive Server (registered trademark) Enterprise (available from Sybase, Inc. of Dublin, Calif.) in an exemplary embodiment, generally operates as an independent process (i.e., independently of the clients), running under a server operating system such as Microsoft (registered trademark) Windows NT, Windows 2000, or Windows XP (all from Microsoft Corporation of Redmond, Wash.), UNIX (Novell), Solaris (Sun), or Linux (Red Hat). The network 320 may be any one of a number of conventional network systems, including a Local Area Network (LAN) or Wide Area Network (WAN), as is known in the art (e.g., using Ethernet, IBM Token Ring, or the like). The network 320 includes functionality for packaging client calls in the well-known Structured Query Language (SQL) together with any parameter information into a format (of one or more packets) suitable for transmission to the database server system 340.

Client/server environments, database servers, and networks are well documented in the technical, trade, and patent literature. For a discussion of Sybase-branded database servers and client/server environments generally, see, e.g., Nath, A., "The Guide to SQL Server", Second Edition, Addison-Wesley Publishing Company, 1995. For a description of Sybase (registered trademark) Adaptive Server (registered trademark) Enterprise, see, e.g., "Adaptive Server Enterprise 12.5.1 Collection: (1) Core Documentation Set and (2) Installation and Configuration," available from Sybase, Inc. of Dublin, Calif. This product documentation is available via the Internet (e.g., currently at sybooks.sybase.com/as.html). The disclosures of the foregoing are hereby incorporated by reference.

In operation, the client(s) 310 store data in, or retrieve data from, one or more database tables 350, as shown at FIG. 3. Data in a relational database is stored as a series of tables, also called relations. Typically resident on the server 330, each table itself comprises one or more "rows" or "records" (tuples) (e.g., row 355 as shown at FIG. 3). A typical database will contain many tables, each of which stores information about a particular type of entity. A table in a typical relational database may contain anywhere from a few rows to millions of rows. A row is divided into fields or columns; each field represents one particular attribute of the given row. A row corresponding to an employee record, for example, may include information about the employee's ID Number, Last Name and First Initial, Position, Date Hired, Social Security Number, and Salary. Each of these categories, in turn, represents a database field. In the foregoing employee table, for example, Position is one field, Date Hired is another, and so on. With this format, tables are easy for users to understand and use. Moreover, the flexibility of tables permits a user to define relationships between various items of data, as needed. Thus, a typical record includes several categories of information about an individual person, place, or thing. Each row in a table is uniquely identified by a record ID (RID), which can be used as a pointer to a given row.

Most relational databases implement a variant of the Structured Query Language (SQL), which is a language allowing users and administrators to create, manipulate, and access data stored in the database. The syntax of SQL is well documented; see, e.g., the above-mentioned "An Introduction to Database Systems". SQL statements may be divided into two categories: data manipulation language (DML), used to read and write data; and data definition language (DDL), used to describe data and maintain the database. DML statements are also called queries. In operation, for example, the clients 310 issue one or more SQL commands to the server 330. SQL commands may specify, for instance, a query for retrieving particular data (i.e., data records meeting the query condition) from the database table(s) 350. In addition to retrieving the data from database server table(s) 350, the clients 310 also have the ability to issue commands to insert new rows of data records into the table(s), or to update and/or delete existing records in the table(s).

SQL statements or simply "queries" must be parsed to determine an access plan (also known as "execution plan" or "query plan") to satisfy a given query. In operation, the SQL statements received from the client(s) 310 (via network 320) are processed by the engine 360 of the database server system 340. The engine 360 itself comprises a parser 361, a normalizer 363, a compiler 365, an execution unit 369, and access methods 370. Specifically, the SQL statements are passed to the parser 361 which converts the statements into a query tree—a binary tree data structure which represents the components of the query in a format selected for the convenience of the system. In this regard, the parser 361 employs conventional parsing methodology (e.g., recursive descent parsing).

The query tree is normalized by the normalizer 363. Normalization includes, for example, the elimination of redundant data. Additionally, the normalizer 363 performs error checking, such as confirming that table names and column names which appear in the query are valid (e.g., are available and belong together). Finally, the normalizer 363 can also look-up any referential integrity constraints which exist and add those to the query.

After normalization, the query tree is passed to the compiler 365, which includes an optimizer 366 and a code generator 367. The optimizer 366 is responsible for optimizing the query tree. The optimizer 366 performs a cost-based analysis for formulating a query execution plan. The optimizer will, for instance, select the join order of tables (e.g., when working with more than one table), and will select relevant indexes (e.g., when indexes are available). The optimizer, therefore, performs an analysis of the query and selects the best execution plan, which in turn results in particular access methods being invoked during query execution. It is possible that a given query may be answered by tens of thousands of access plans with widely varying cost characteristics. Therefore, the optimizer must efficiently select an access plan that is reasonably close to an optimal plan. The code generator 367 translates the query execution plan selected by the query optimizer 366 into executable form for execution by the execution unit 369 using the access methods 370.

All data in a typical relational database system is stored in pages on a secondary storage device, usually a hard disk. Typically, these pages may range in size from 1 Kb to 32 Kb, with the most common page sizes being 2 Kb and 4 Kb. All input/output operations (I/O) against secondary storage are done in page-sized units—that is, the entire page is read/written at once. Pages are also allocated for one purpose at a time: a database page may be used to store table data or used for virtual memory, but it will not be used for both. The memory in which pages that have been read from disk reside is called the cache or buffer pool.

I/O to and from the disk tends to be the most costly operation in executing a query. This is due to the latency associated with the physical media, in comparison with the relatively low latency of main memory (e.g., RAM). Query performance can thus be increased by reducing the number of I/O operations that must be completed. This can be done by using data structures and algorithms that maximize the use of pages that are known to reside in the cache. Alternatively, it can be done by being more selective about what pages are loaded into the cache in the first place. An additional consideration with respect to I/O is whether it is sequential or random. Due to the construction of hard disks, sequential I/O is much faster then random access I/O. Data structures and algorithms encouraging the use of sequential I/O can realize greater performance.

For enhancing the storage, retrieval, and processing of data records, the server 330 maintains one or more database indexes 345 on the database tables 350. Indexes 345 can be created on columns or groups of columns in a table. Such an index allows the page containing rows that match a certain condition imposed on the index columns to be quickly located on disk, rather than requiring the engine to scan all pages in a table to find rows that fulfill some property, thus facilitating quick access to the data records of interest. Indexes are especially useful when satisfying equality and range predicates in queries (e.g., a column is greater than or equal to a value) and "order by" clauses (e.g., show all results in alphabetical order by a given column).

A database index allows the records of a table to be organized in many different ways, depending on a particular user's needs. An index key value is a data quantity composed of one or more fields from a record which are used to arrange (logically) the database file records by some desired order (index expression). Here, the column or columns on which an index is created form the key for that index. An index may be constructed as a single disk file storing index key values together with unique record numbers. The record numbers are unique pointers to the actual storage location of each record in the database file.

Indexes are usually implemented as multi-level tree structures, typically maintained as a B-Tree data structure. Pointers to rows are usually stored in the leaf nodes of the tree, so an index scan may entail reading several pages before reaching the row. In some cases, a leaf node may contain the data record itself. Depending on the data being indexed and the nature of the data being stored, a given key may or may not be intrinsically unique. A key that is not intrinsically unique can be made unique by appending a RID. This is done for all non-unique indexes to simplify the code for index access. The traversal of an index in search of a particular row is called a probe of the index. The traversal of an index in search of a group of rows fulfilling some condition is called a scan of the index. Index scans frequently look for rows fulfilling equality or inequality conditions; for example, an index scan would be used to find all rows that begin with the letter 'A'.

The above-described computer hardware and software are presented for purposes of illustrating the basic underlying desktop and server computer components that may be employed for implementing the present invention. For purposes of discussion, the following description will present examples in which it will be assumed that there exists a "server" (e.g., database server) that communicates with one or more "clients" (e.g., personal computers such as the above-described system 100). The following discussion also uses examples of queries requesting information from XML documents stored in a database system; however, the present invention may also be used in conjunction with documents written in various other markup languages, including, but not limited to, cHTML, HTML, and XHTML. The present invention, however, is not limited to any particular environment or device configuration. In particular, a client/server distinction is not necessary to the invention, but is used to provide a framework for discussion. Instead, the present invention may be implemented in any type of system architecture or processing environment capable of supporting the methodologies of the present invention presented in detail below.

Overview of Execution of Functions in XML Queries

The present invention comprises a system providing methodology for execution of functions in queries (e.g., query expressions in the XPath query language) requesting data from a markup language (e.g., XML) document. The following discussion focuses on executing queries requesting information from an XML document; however the system and methodology of the present invention may also be used for obtaining information from other types of markup language or tag-delimited sources of information. Accordingly, the references to XML in the following discussion are used for purposes of illustration and not limitation. The system and methodology of the present invention takes into account important characteristics of existing XML query engines, including the use of path indexes and document ordering in path indexes. An important aspect of the present invention is that it can provide results in sorted order based on the document ordering, consistent with the requirements of the XPath standards. The present invention exploits the sorting in a database system without requiring the data to be sorted several times, thereby providing a performance advantage when compared with other database systems. The present invention also provides improved performance by using a bottom-up processing approach.

The present invention addresses a number of challenges in executing a query including a function for obtaining data from an XML document. The following discussion will illustrate some of these challenges and introduce the manner in which these challenges are addressed by the system and methodology of the present invention. Consider, for instance, the following path-based query expression requesting information from an XML document stored in a database system: /bookstore/book/tolower(author//*). Also assume that the information is requested from the simple XML document shown below. The nodes of the following example XML document are numbered (from node 1 to node 6) for clarity of presentation:

```
1<bookstore>
 2<book>
    3<title> First Course in Algebra </title>
    4<author>
       5<lname>War</lname>
       6<fname>Alison</fname>
    </author>
 </book>
</bookstore>
```

The above query requests a lower-case value of all the text stored at any depth in the XML document from an author node of a book. A naive approach for obtaining this information involves the following steps:

Step 1. (Traversal) Paths of the XML document are traversed to find a book in a bookstore and locate the author of the book. The entire subtree of an author is then traversed. In the above example, the subtree starting from the author node contains nodes 4, 5, and 6.

Step 2. (Argument marshalling) The tolower( ) function can accept only string-values and not the node ids. Accordingly, all of the nodes in the subtree need to be aggregated by concatenating string values of each node in the subtree. In this case the aggregation result is "WarAlison". It should be noted that this aggregation result is a transient value created from persistent nodes 5 and 6. This transient value is associated with author node 4. Thus, providing the values of arguments to a function (e.g., the tolower( ) function) requires substantial processing. In the following discussion, the steps of traversal and argument marshalling are referred to together as "aggregation".

Step 3. (Function invocation) The aggregated value (e.g., "WarAlison") obtained as a result of the above steps (step 1 and 2) is passed to the tolower( ) function.

Step 4. (Return Values) The output of the tolower( ) function will be a string. This string needs to flow through the query engine so that it gets returned to the client that submitted the query. It should be noted that the output of the function is a transient value that is derived from the transient value generated above at step 2.

Step 5. (Outer Context) The output of the tolower( ) function is specific to the book (e.g., the book represented above at node 2 with the title "First Course in Algebra" as shown at node 3). For other books, the value generated (output) by the tolower( ) function will typically be different (i.e., as other books will have different authors). Hence, when the transient value output by the function flows in the query engine, this transient value needs to be associated with the correct book. In other words, the identifier for the correct book (e.g., the book represented at node 2 of the above XML document) should be associated with the result, rather than continuing to associate the result with the author node as provided above at step 2. The present invention addresses the challenge of return values and their correlation to outer context through a mechanism referred to as "transient value association".

The process of argument marshalling and handling of the aggregation boundary is particularly important when an n-ary function such as concat( ) takes more than one argument. In such cases, each argument needs to be generated correctly based on its association to the outer path. For example, consider the following XPath query: /bookstore/book/concat(author/lname, ",", author/fname). In this case, there are three arguments to the concat( ) function. The second argument is a constant literal (","). The first and third arguments (author/lname and author/fname) need to be evaluated for each book. Thus a book is an aggregation boundary for arguments 1 and 3. The next level of complexity is introduced when the concat( ) function looks at these three arguments together. To generate correct results, the system must ensure that the author/lname and author/fname received by the concat( ) function at any point correspond to the same book. Thus, the concept of an aggregation boundary plays a significant role with n-ary functions such as this concat( ) function.

The present invention includes software machinery that can handle a mixture of user supplied literal values, transient values generated during query processing, and persistent node ids. It also enables transient values generated during query processing to be associated with persistent nodes through node ids (i.e., through a "NodeVal API" as hereinafter described).

The system and methodology of the present invention provides for aggregation of XPath expressions using a "NodeToAtomValue" (or node to atomic value) operator. In addition, a state-transition machine (automata) is provided that facilitates synchronization of aggregated XPath expressions, transient values, and literals (Function Operator). The Function Operator includes software machinery that can handle complex expressions, including gracefully handling (synchronizing) empty transient values and/or empty results of XPath expressions. The present invention allows transient values in each place where an existing node id based API can be present in the query engine. This approach exploits the property of document ordering in path indexes and avoids sorting in the query engine. Before describing the methodology of the present invention in more detail, an environment in which the present invention may be implemented and some examples of queries requesting retrieval of data in XML format will first be described.

Tree Representation of Sample XML Document

XML is a widely accepted model for representing data. In recent years, XML has become pervasive both in representing stored data and communicating data over a network. The following discussion illustrates the operations of the present invention using several examples of an XML document including books in a bookstore. A simple example of an XML document is as follows:

```
<bookstore>
    <book>
        <title>Trenton</title>
        <author>
            <fname>Mary</fname>
            <lname>Bob</lname>
        </author>
    </book>
    <book>
        <title>National</title>
        <author>
            <fname>Joe</fname>
            <lname>Bob</lname>
        </author>
    </book>
</bookstore>
```

Figure 4:
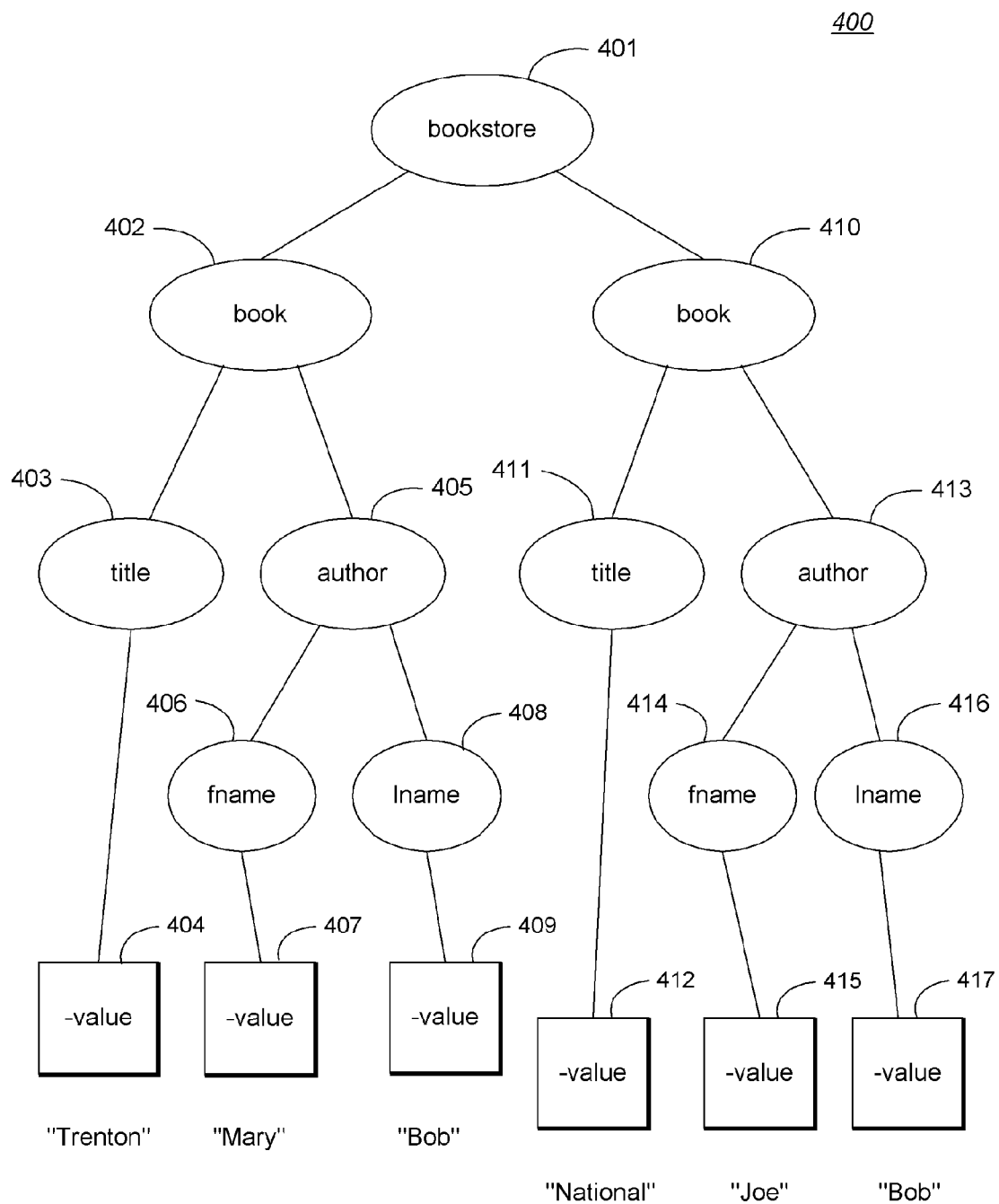
FIG. 4 is a block diagram illustrating a tree representation of an XML document.

Unlike conventional data in a relational database which is maintained in a flat structure, information in an XML document is usually maintained in a tree structure. FIG. 4 is a block diagram illustrating a tree representation of the above XML document. As shown at FIG. 4, each element or value in the XML document has been converted to a node in the tree. These nodes are numbered in a pre-determined manner. The number corresponding to each node is called a "node id" of the element or tree node. This concept of node id is important in XML query processing. As shown, nodes of the tree include a bookstore 401, a first book 402, and a second book 410. Children nodes of book 402 provide access to additional information regarding each book, including title 403, and author 405, including author first name (fname) 406 and author last name (lname) 408. Book 410 similarly has associated children nodes 411, 413, 414, and 416. As shown, the title, first name (fname), and last name (lname) nodes of each book have associated data values.

As previously described, XPath is a query language for querying data in XML documents. An example of an XPath query for requesting data in the above example XML document is as follows:
/bookstore/book/title An example of a SQL version of the above XPath query that can be used in the currently preferred embodiment of the system of the present invention is as follows:
{select xmlextract('/bookstore/book/title', xmlcol) from bookstoretable}

The above XPath query would return the following answer based on the example XML document shown above:
Answer: <title> Trenton </title><title> National</title>

Another example of an XPath query is:
/bookstore/book[title='Trenton']/author/lname A SQL version of this query is as follows:
{select xmlextract('/bookstore/book[title='Trenton']/author/lname', xmlcol) from bookstoretable}

As shown, the above SQL query specifies the path from which data is to be selected (in the form select xmlextract (path)) as well as the column name (xmlcol) and table (bookstoretable). Also, in the above query the "[" operator (or "square bracket" operator) provides for filtering out books based on comparing the title of the book to 'Trenton'. This operator corresponds to a "where" clause in a SQL query. The last name of the author of such books is then projected. The above query would return the following answer based on the example XML document shown above:
Answer: <lname> Bob </lname>

Motivating Examples of XPath Functions

Although the present invention provides support for a variety of different functions, four representative functions are used in this document for purposes of illustrating the operation of the present invention. It should be understood that these functions are provided for purposes of illustration and not limitation and that the system and methodology of the present invention may also be used with a number of other functions. The four functions described in the following examples are as follows: (1) tolower( ); (2) toupper( ); (3) normalize-space( ); and (4) concat( ). These functions allow a broader class of XPath queries when an XML document schema is unknown, and particularly when the contents of text fields have a mix of lower/upper cases with arbitrarily interspersed white-spaces.

For instance, the tolower( ) and toupper( ) functions may be used in the situation described above of books in a bookstore in which one publisher uses all upper-case letters for author names and another publisher uses a "first-letter capitalized" style. A user looking to find all the books in which the author's first name is John (or JOHN) can use string functions such as tolower( ) or toupper( ) to perform a case-free comparison as provided in the following two XPath queries:
/bookstore/book[tolower(author/first-name)='john']
/bookstore/book[toupper(author/first-name)='JOHN']

The function normalize-space( ) allows users to run a broader set of queries where the number of white-spaces in the text is unknown. For instance, if one publisher chooses to write a title of a book as: "FLUID MECHANICS", and another publisher chooses to write it as:
"FLUID   MECHANICS",
the following query will eliminate the unnecessary white-spaces and new line. This function compares the characters in the title of the books:
/bookstore/book[normalize-space(title)='FLUID MECHANICS']

A more general version of this query takes into account the possibility of case-sensitivity of the titles as per the publisher's choice:
/bookstore/book[toupper(normalize-space(title))= 'FLUID MECHANICS'].

Such a general query is not possible for documents with unknown structures and styles without the use of the functions normalize-space( ) and toupper( ).

The ability provided by the present invention to use functions in queries also allows a user to concatenate multiple strings and produce desired output. For example, a user may use the following example query:
/bookstore/book/author/concat(last-name, ",", first-name).

System Components

Implementation Environment

Figure 5:
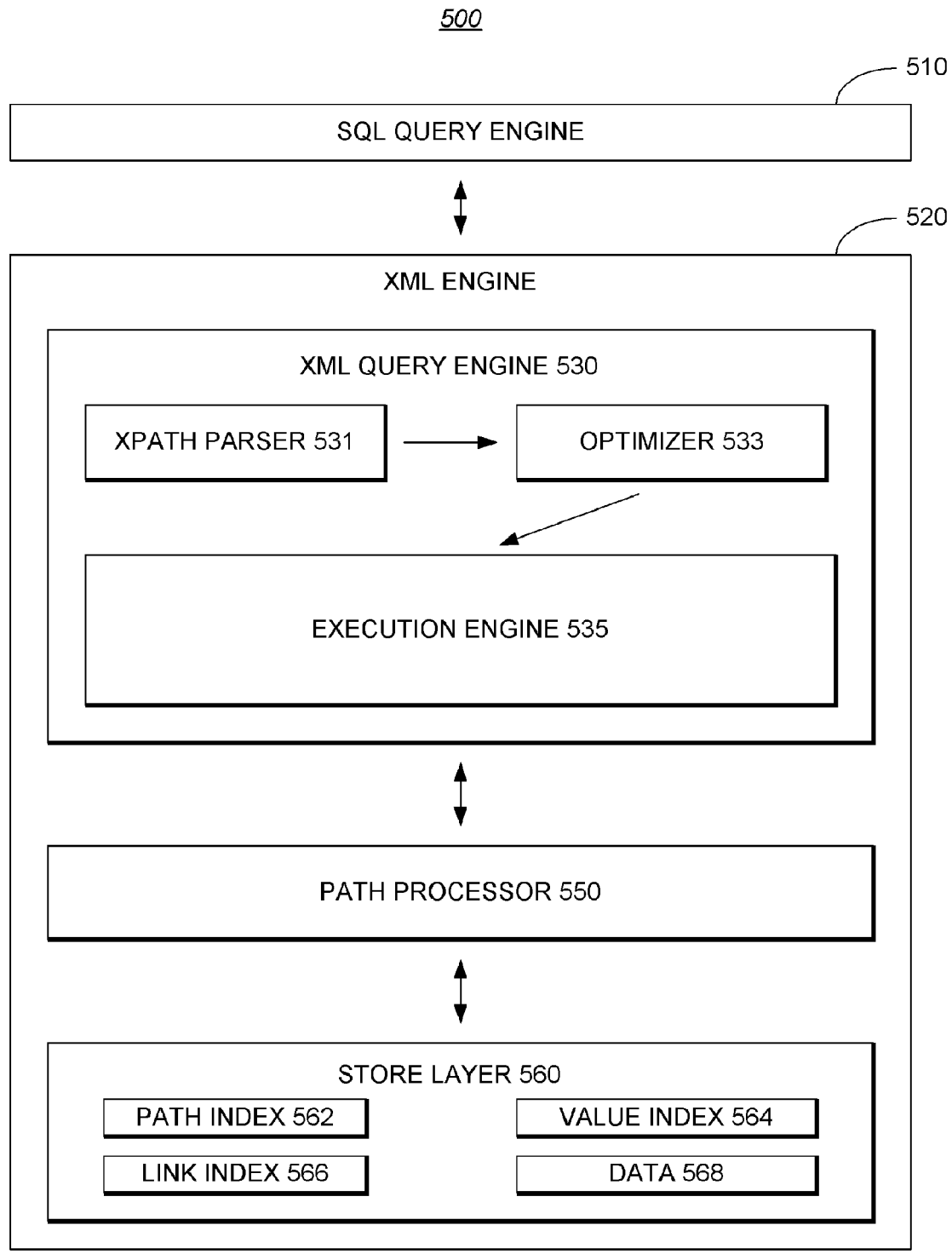
FIG. 5 is a block diagram illustrating an environment in which the present invention may be implemented.

FIG. 5 is a block diagram illustrating an environment 500 in which the present invention may be implemented. The environment 500 includes an SQL Query Engine 510 and an XML Engine 520. The XML Engine 520 provides mechanisms for storage and retrieval of information in the XML format. As shown at FIG. 5, the XML Engine 520 includes as core components an XML Query Engine 530, a Path Processor 550, and a Store Layer 560.

The XML Engine 520 includes parse time functionality that transforms each XML document into a collection of bytes that can be stored in a database or file system. Furthermore, a streaming interface over this data is defined to provide fast, random access to the structures within it. The streaming interface includes a fast access structure, which is a flexible interface that enables free movement amongst, and efficient access to the underlying XML data. The XML Engine 520 also has query execution-time functionality for retrieving data in response to queries.

One role of the XML Engine 520 is to transform an XML document for storage in a database. The XML Engine 520 transforms an XML document by analyzing the document as a tree. An XML document can be viewed as a graph where: (1) each element is a node; (2) the text or value (e.g., the value "Mary" as the first name of an author) associated with an element is a leaf node; (3) each attribute (e.g., Style=textbook) is a leaf node; (4) each node is labeled uniquely; and (5) all nodes are labeled in the order they occur in the source document.

During the transformation process, each node is labeled uniquely by assigning an integer to each node in a monotonically increasing order. This integer is referred to as object ID or OID. During this process, each element of the source document is visited in turn and each element is numbered based upon the order it occurs in the document. An object is created by the XML Engine 520 which contains data from the transformed document together with auxiliary structures to aid in faster access to the data. During the transformation process, each element of an XML document is treated as a node or leaf (i.e., terminal node) and these nodes and leaves are annotated to provide faster access to data. The structure of the tree itself is derived from the structure of the source document.

As shown at FIG. 5, a path index 562, a value index 564, a link index 566, and data 568 are maintained by the store layer 560 of the XML Engine 520. The link index 566 stores linkage information about the parent-child relationship of nodes. This linkage information enables the source document to be recomposed when required. The path index 562 stores hierarchical information about particular items of data in the order that these items occur in the source document. The value index 564 stores values for a given path in a sorted order to enable more efficient searches. The data 568 represents data that is associated with particular nodes. For further description of an environment in which the present invention may be implemented, see e.g., commonly-owned U.S. Pat. No. 6,799,184 titled "Relational Database System Providing XML Query Support".

XML data is stored in the database system in an image column in a parsed format, or in the text, or in image columns as "raw" XML. In a parsed format, it contains a path index 562, link index 566, and value index 564. The Store Layer 560 of the XML Engine 520 converts the text representation of these indexes and data 568 into an internal representation which is efficient for storage. The Store Layer 560 is also responsible for converting the representation to its textual form when the Path Processor 550 (path processing layer) requests a certain piece of information during query processing.

As shown at FIG. 5, an XPath query may be transmitted to the XML Engine 520 by the SQL Query Engine 510. For instance, a user may submit the following SQL query requesting information from the database:
{select    xmlextract('/bookstore/book[title='Trenton']/author/lname', xmlcol) from bookstoretable}

From the above query, the SQL Query Engine 510 extracts the following XPath portion of the above expression and sends it to the XML Query Engine 530:
/bookstore/book[title='Trenton']/author/lname The XPath portion of the query is handled by the XML Query Engine 530, which includes query execution-time functionality for retrieving data in response to queries. The XML Query Engine 530 includes an XPath parser 531, an optimizer 533, and an execution engine 535. Within the XML Query Engine 530, the XPath parser 531 parses the XPath portion of the query received from the SQL Query Engine 510 and converts it into a query tree representation. The XPath parser 531 includes a normalization module (not separately shown at FIG. 5) for normalization of the XPath expression. The query tree representation generated by the XPath parser 531 is then sent to the optimizer 533 which generates a physical query plan (execution plan) for execution of the query. The query plan is then provided to the execution engine 535 which interprets the query plan and executes it with the support of the store layer 560. It should be noted that although the original query submitted by the user appears to only include a single path, execution of the query plan may break this expression into multiple paths. For instance, a first path may try to extract all the titles while another path may extract the last names, and so on and so forth.

The Path Processor 550 serves as an interface between the XML Query Engine 530 and the Store Layer 560. The Path Processor 560 is an abstract API which accepts path requests from the XML Query Engine 530 and returns back node ids (corresponding to persisted nodes of the XML document). The Path Processor 550 invokes services of the Store Layer 560 to identify the nodes that satisfy the query expression (e.g., XPath expression) and returns an instance of an abstract object named "Dompp". This Dompp object is returned back to the query layer (i.e., XML Query Engine 530).

The XML Query Engine 530 uses various services of the Dompp such as getValue( ) and/or compare( ) to compute the results of the query. However, the XML Query Engine 530 is not aware of the node ids stored in Dompp. In other words, Dompp acts as a medium to carry node ids through various components of the system. It should be noted that prior to the present invention, Dompp did not include a mechanism for carrying or associating a value with nodes. Rather, its getValue( ) service materialized a node in memory by retrieving the node's value from persistent storage. As a result, prior to the present invention, the engine included no mechanism to store or carry a transient (derived) value which might be computed from a persistent value. The following section describes how the above system is improved to implement the methodology of the present invention. The enhancements provided by the present invention include extending Dompp (SYB_Dompp) to carry both node ids and transient values.

Enhancements to XML Engine

Figure 6:
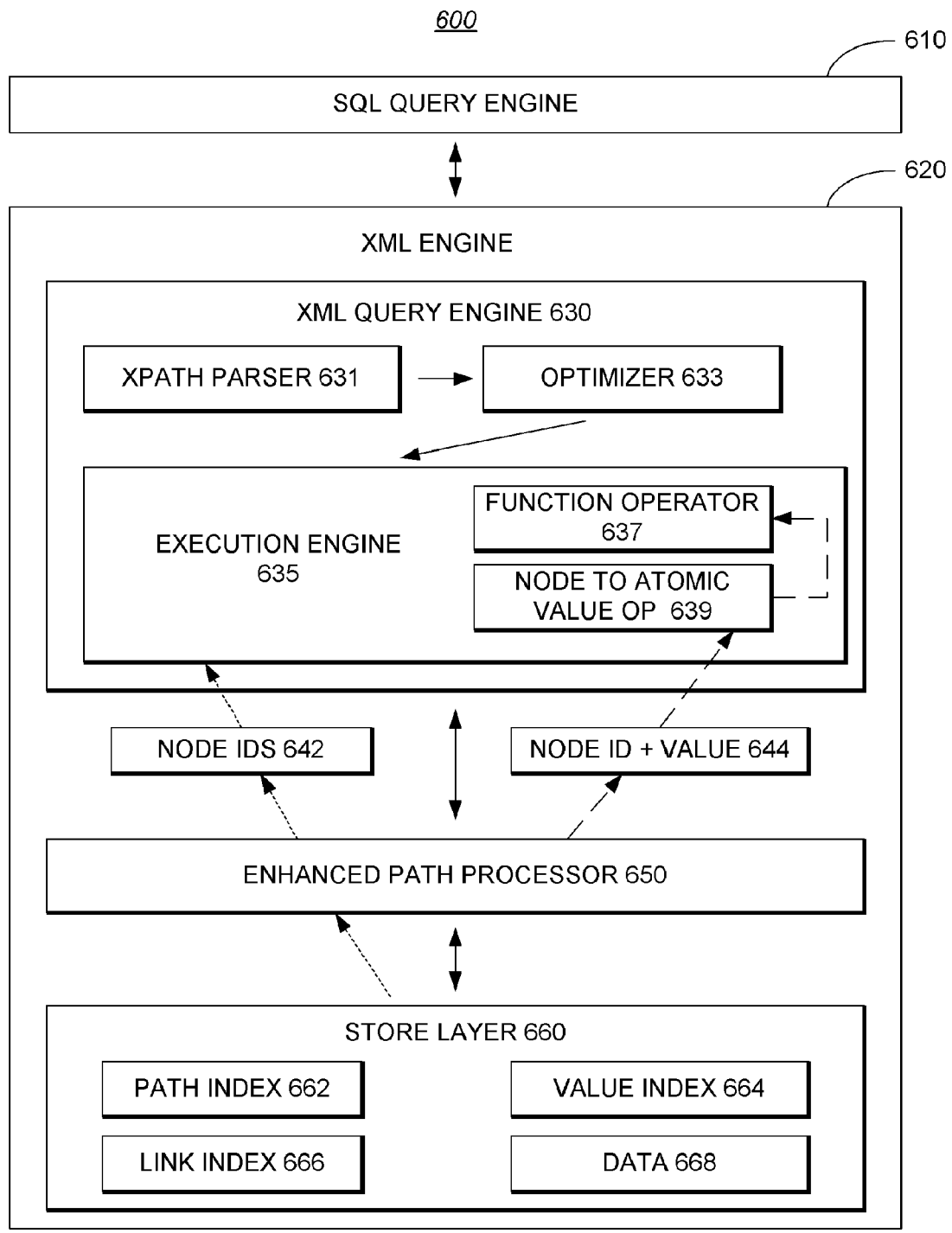
FIG. 6 is a block diagram illustrating the modification of the XML Engine of FIG. 5 to incorporate the system and methodology of the present invention.

FIG. 6 is a block diagram illustrating the modification of the XML Engine of FIG. 5 to incorporate the system and methodology of the present invention. As shown, the environment 600 includes an SQL Query Engine 610, and an XML Engine 620. The components of the XML Engine 620 include an XML Query Engine 630, an Enhanced Path Processor 650, and a Store Layer 660. The XML Query Engine 630 includes an XPath parser 631, an optimizer 633, and an execution engine 635. Of particular interest, the execution engine 635 of the XML Query Engine 630 also includes as new components a Function Operator 637 and a Node to Atomic Value Operator (sometimes referred to herein as NodeToAtomValue operator) 639 which implement methodology of the present invention. These components and their operations are described below. In addition, the Enhanced Path Processor 650 includes extensions (i.e., a NodeVal API) which provide for handling transient values as well as node ids. The Store Layer 660 includes the path Index 662, value index 664, link index 666, and data 668. Various other components of the XML Engine 620 are also enhanced to support methodology of the present invention, although these enhancements are not separately shown at FIG. 6.

The present invention introduces a mechanism for query execution based on an aggregation of values that result into transient values which are not stored on the persistent storage themselves. The XML Engine 620 of the present invention allows not only for the flow of "node ids" as illustrated at 642 at FIG. 6, but also for the association of node ids with transient values as illustrated at 644. This enables the execution engine 635 to handle not only these node ids, but also to deal directly with values. This provides improved efficiency, as it is more efficient in many instances to deal with directly with values. The ability to deal with values also enables a larger set of operations (e.g., functions) to be performed during execution of the query.

The present invention provides functionality enabling node ids to be associated with values. This association is implemented using abstract objects that are consistent with the objects used to transmit node ids from one operator to another. Hence, the new abstract objects seamlessly fit into the hierarchy of the existing operators and also allow values to flow inside the XML Engine 620. This is represented at FIG. 6 by the flow of a node id and value 644 from the Enhanced Path Processor 650 to the Node to Atomic Value Operator 639, the Function Operator 637, and the other operators in the execution engine 635 of the XML Query Engine 630. It should be noted that although FIG. 6 refers to this as a node id and a value 644, in operation a plurality of node ids may be associated with a value.

The ability to handle values enables the Function Operator 637 to perform various operations on these values, such as the tolower( ), toupper( ), concat( ), and normalize-space( ) functions described above. The Node to Atomic Value Operator 639 serves to convert or provide an atomic value for a given node. The Node to Atomic Value Operator 639 is also able to handle paths and perform aggregation on those paths. The Node to Atomic Value Operator 639 provides inputs to the Function Operator 637 in appropriate format enabling the Function Operator 637 to perform operations on these inputs.

Aggregation of Values

The following example XPath query will be used to illustrate the concept of aggregated values:
/bookstore/book[tolower(author//*)='joe bob']

In the above query, there are two different sets of derived (or transient) values. The first derived value is the aggregation of first-name/last-name values to be fed into the function tolower( ). The tolower( ) function is invoked for every book under bookstore. The arguments are marshaled by gathering all the elements under the author element for the current book and then concatenating the text nodes of all the child elements. This argument is the first derived value.

Referring to FIG. 4 which illustrates a block diagram of an XML document tree, the handling of aggregated transient values will next be described. The above expression provides for the tolower( ) function to be invoked twice: once for node 402 and once for node 410 as shown at FIG. 4. When tolower( ) is invoked with node 402, the value of the argument is 'Mary Bob'. This is the concatenation of all the text values (i.e., node ids {407, 409}) for all the nodes that follow the path "author//*" (i.e., node ids {406, 408}) under node 402. When tolower( ) is invoked with node 410, the value of the argument is 'Joe Bob'. This argument is the concatenation of all the text values (i.e., node ids {415, 417}) for all the nodes that follow the path "author//*" (i.e., node ids {414, 416}) under node 410.

The second set of derived (or transient) values is the result of the tolower( ) function. (It should be noted that the terms "derived values" and "transient values" are used interchangeably in this discussion). This set of derived values is used in the comparison operation. For example, for the XML document tree shown in FIG. 4, the tolower( ) function is also invoked for node 402 and for node 410. When tolower( ) is invoked with node 402, the return value is 'mary bob'. When tolower( ) is invoked with node 410, the return value of tolower( ) is 'joe bob'. These derived values are then compared with the value specified in the query (e.g., 'joe bob').

Aggregation Boundaries

Aggregation boundaries play an important role in the new physical query plan operator (FunctionOp as represented by Function Operator 637 at FIG. 6) in the present invention. The design of the Function Operator (FunctionOp) is challenging because the Function Operator has to marshal its arguments at the correct boundaries as defined by the outer path context. The challenge increases in a high performance engine (e.g., the XML Engine used in the currently preferred embodiment of the present invention) where top down access is discouraged and node ids are generally accessed through a path index for faster access.

The notion of aggregation boundaries can by explained by example. Consider the following example query:
/bookstore/book[tolower(author//*)='joe bob']

In this query, there are only two access paths that can be accessed using the fast indexes: "/bookstore/book" and "/bookstore/book/author//*". These path scans return the result in a flat form (i.e., the nodes in "/bookstore/book" have no association with "/bookstore/book/author//*" unless the query engine implements an intelligent algorithm to derive these relationships). Not only does the Function Operator need to keep track of the parent-descendant association between individual nodes in the two sets, but it also needs to identify the nodes that share the same ancestor to the same parent in the set of nodes for the descendants.

For example, if this query is run using the high performance indexes like path indexes against the document shown in the XML document tree in FIG. 4, the first step is to get the nodes that follow the path "/bookstore/book" which is the result {402, 410}. The second step is to get the nodes that follow the path "/bookstore/book/author//*" which gives the result {406, 408, 414, 416}. But a Function Operator cannot work over these sets directly.

When a Function Operator is invoked, it has to make sure that the first argument is an aggregation over the aggregation boundary defined by node id 402 (i.e., it has to aggregate only {406, 408} as shown at FIG. 4). The argument for the second invocation has to be over the aggregation boundary defined by node id 410 (i.e., it has to aggregate only {414, 416}). The present invention enables the information about the author of each book (e.g., the books represented by nodes 402 and 410 as shown at FIG. 4) to be aggregated separately for each book node. These aggregated values may then be operated on by functions. The manner in which transient values are generated, aggregated, and operated on by functions is described below.

Transient Values and their Associations

Existing XML query engines generally allow the flow of only node ids from one operator to another; the concept of transient values was not supported. Transient values are values generated during marshalling of arguments and as results of a Function Operator. The present invention provides a new physical query plan operator (i.e., a NodeToAtomValue operator) which is responsible for individual argument marshalling. It creates an abstract object called NodeVal from the node ids obtained from the lower level physical operators in the query plan. The NodeToAtomValue operator mainly associates the node ids to a value which is derived either from a single incoming node, or aggregated from multiple incoming nodes.

For example, consider the query from the prior example:
/bookstore/book[tolower(author//*)='joe bob']

In this query the result of the tolower function is used to filter the "book" nodes. With the high performance, bottom-up evaluation strategy used by the present invention, a transient value needs to be associated with a node (e.g., a "book") that is stored on disk. The solution to this problem is an association of transient values to the aggregation boundary nodes in the XML document tree. Referring again to FIG. 4, the values 'mary bob' and 'joe bob' are associated with the book at node 402 and the book at node 410, respectively. A query engine does not have the luxury of changing on-disk data for a read-only query. Therefore, the present invention incorporates the notion of derived value nodes that are represented by the object NodeVal and constructed at execution time by the NodeToAtomValue operator. The constructed NodeVal object is like any other node object in the system that has an identity (e.g., node 402 as shown at FIG. 4), but with additional transient value information (e.g., 'mary bob').

There are several complexities in properly handling derived (transient) values that are addressed by the present invention. These issues will be briefly discussed before describing the mechanisms provided by the present invention for addressing them.

One issue concerns missing "aggregate boundaries". Consider, for example, the following query which requests the concatenation of an author's first name and last name:
/bookstore/book/author/concat(last-name, ",", first-name)

The above query may be run against a document in which for a particular book record an author may not be present at all, such as illustrated by the following example:

```
<bookstore>
    <book>
        <title>Trenton</title>
        <author>
            <fname>Mary</fname>
            <lname>Bob</lname>
        </author>
    </book>
    <book>
        <title>National</title>
        <editor-name>Joe Bob</editor-name>
    </book>
</bookstore>
```

Another issue involves sorted transient values. The output of the functions is expected to follow document ordering as provided in the XML standards' specification. For example, consider the following XPath query expression:
/bookstore/book/title/tolower( )

The correct answer that should be returned to provide the results in the proper ordering is: "trenton national" because "trenton" is found earlier in the document than "national."

A third problem concerns aggregating complex XPath expressions. Instead of strings or element-names as arguments to functions, a user may write complex XPath expressions. For instance, consider the following query in which the intended output is the lower case last name of the author whose first name is "John":
/bookstore/tolower(book/author[first-name="John"]/last-name).

Another concern involves user-supplied transient values. A user may simply supply a literal string as an argument, for example:
/bookstore/book/author/tolower('SMITH').

Aggregation over nested functions also needs to be addressed. An argument to a function may be an output of another function. For example, the following query provides for the output of a normalize-space function to be converted to upper case by a toupper( ) function:
/bookstore/book[toupper(normalize-space(title))='FLUID MECHANICS'].

Additionally, aggregation over mixed expressions needs to be considered. For n-ary functions arguments could be mixed, such as:
/bookstore/book/author/concat("FIRST NAME:", first-name, "LAST NAME:", toupper(last-name))".

Finally, aggregation and empty values should be addressed. Some of the XPath expressions in arguments may return empty values. For instance, a document may contain a book that does not have a last name (lname) element for an author, but does have a first name (fname) element. In such a case the missing value is considered an empty value, and functions need to be able to generate correct results in this circumstance. For example, assume an XML document as follows:

```
<bookstore>
    <book>
        <title>National</title>
        <author><fname>Joe</fname></author>
    </book>
    <book>
        <title>Trenton</title>
        <author>
            <fname>Mary</fname>
            <lname>Bob</lname>
        </author>
    </book>
</bookstore>
```

Consider the following example query against the above XML document which requests both last name and first name of authors with a semicolon separating one author from another:
/bookstore/book/concat(author/lname, " ", author/fname, ";")

Based on the above XML document, the correct answer for this query is "Bob Mary; Joe;" which provides the first name and last name of the first author (Bob Mary) and only the first name of the second author (Joe) whom is only identified in the XML document by first name. Incorrect answers that may result from not properly handling empty values (e.g., the last name of the second author) would include "Bob Joe; Mary;" or "Bob Joe; Bob Mary;". The present invention provides the ability to identify these type of situations and generate correct results in response to these more complex types of queries.

Detailed Operation

The following description presents method steps that may be implemented using processor-executable instructions, for directing operation of a device under processor control. The processor-executable instructions may be stored on a computer-readable medium, such as CD, DVD, flash memory, or the like. The processor-executable instructions may also be stored as a set of downloadable processor-executable instructions, for example, for downloading and installation from an Internet location (e.g., Web server).

The following will describe the operations of the present invention in handling an example query. For purposes of this discussion, the following example query is used:
/bookstore/book/concat(author/lname, " ", author/fname, ";")

Figure 7A:
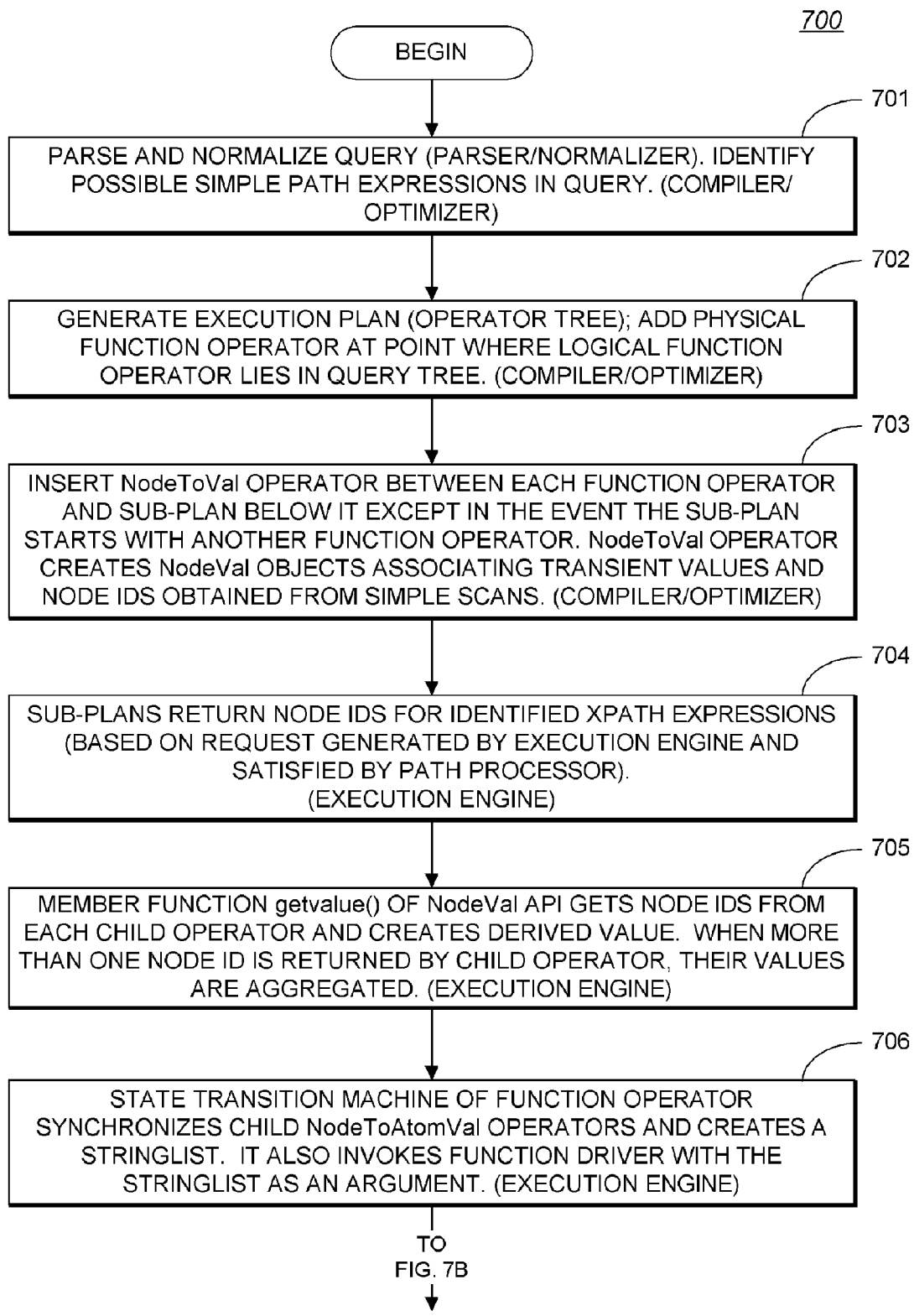
FIGS. 7A-B comprise a single flowchart illustrating the method steps of operation of the present invention in handling a query.
Figure 7B:
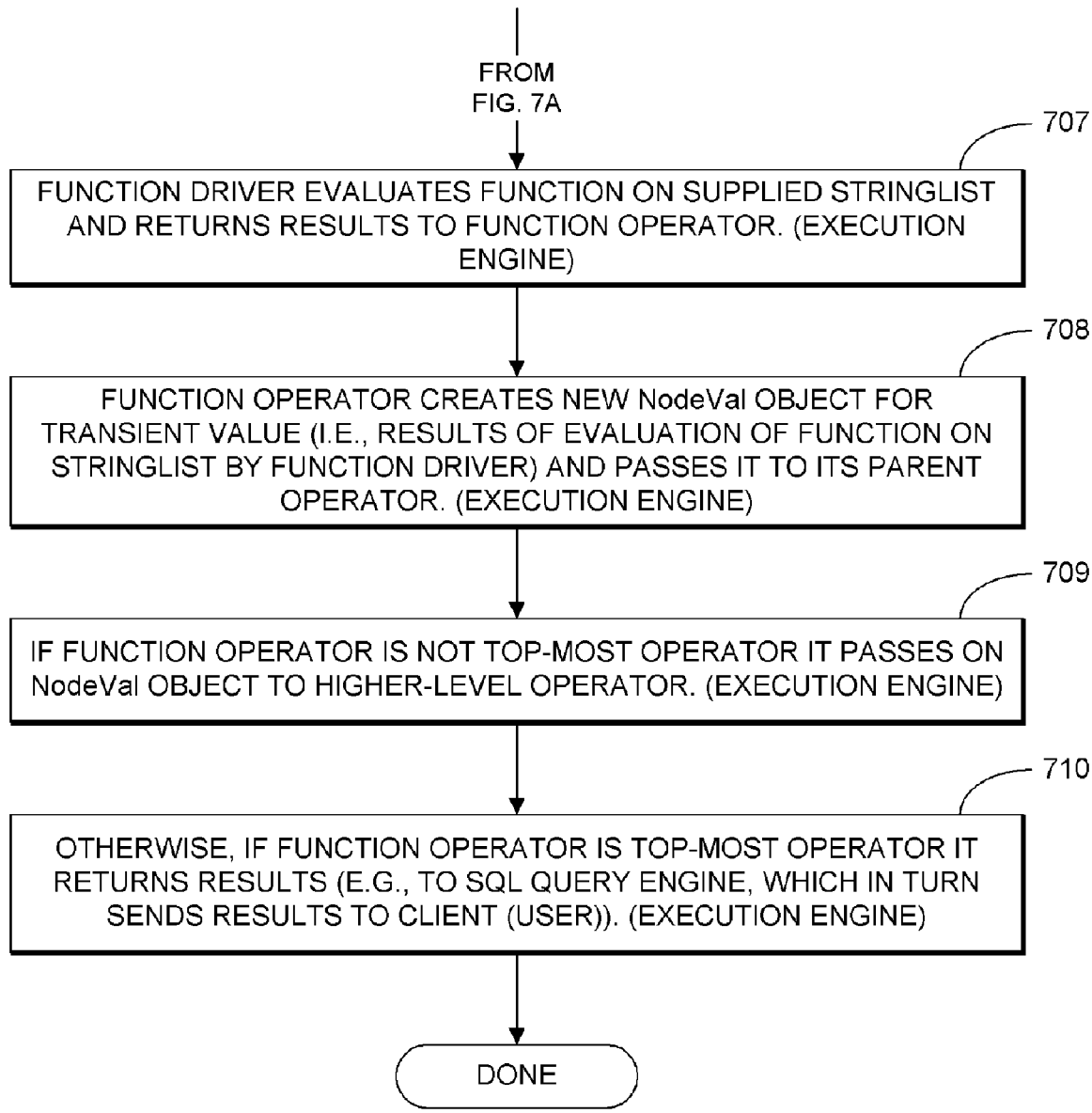

FIGS. 7A-B comprise a single flowchart 700 illustrating the method steps of operation of the present invention in handling a query. The above example query expression including a concat( ) function may, for instance, be received by the XML Query Engine of the present invention from an SQL Query Engine. (Note that the SQL Query Engine may already have extracted this XPath query from an SQL query). At step 701, the query is parsed and normalized and the possible simple path expressions in the query are identified by the compiler/optimizer (i.e., the compiler/optimizer of the XML Query Engine). In this case there are three simple path expressions in this example query which are as follows: "/bookstore/book"; "/bookstore/book/author/lname"; and "/bookstore/book/author/fname".

At step 702, the execution plan (operator tree) is generated by the compiler/optimizer. During the generation of the execution plan, a physical function operator is added to the operator tree at the point where the logical function operator lies in the query tree. For example, in this case a Function Operator is added to the execution plan in the place of concat( ) in the query tree.

At step 703, a NodeToVal operator is inserted between each Function Operator and the sub-plan below it by the compiler/optimizer except in the event that the sub-plan below it starts with another function operator. In the simplest case, the NodeToVal operator is inserted between a Function Operator and a simple scan operator below it. The NodeToVal operator creates NodeVal objects that associate transient (or derived) values and the node ids obtained from the simple scans. The NodeToVal operator not only consolidates information, but also tracks where the information came from (i.e., the branch of the tree from which the information originated). These NodeVal objects are allowed to flow through the system in the same manner as other objects (e.g., Dompp objects) of the system. This allows the two types of search contexts to be seamlessly mixed by the execution engine.

At step 704, the sub-plan below NodeToVal operator returns node ids for identified XPath expressions (i.e., based on the request generated by the execution engine and satisfied by the path processor). Recall that the example query included the following three simple path expressions: "/bookstore/book"; "/bookstore/book/author/lname"; and "/bookstore/book/author/fname". The node ids for these three simple path expressions are requested by the execution engine and satisfied by the Path Processor.

At step 705, the member function getvalue( ) of the NodeVal API gets node ids from each child operator (child node) and creates a derived value (derivedValue). When more than one node id is returned by child operator, their values are aggregated. At step 706, after the values are obtained from all the child NodeToAtomVal operators, the state transition machine of the function operator synchronizes all the child NodeToAtomVal operators and creates a stringlist. It also invokes a function driver with the stringlist as an argument. At step 707, the function driver evaluates the function (e.g., the concat( ) function) on the supplied stringlist and returns results to the Function Operator. In the currently preferred embodiment, these steps are performed in the execution engine of the XML Query Engine.

At step 708, the Function Operator creates a new NodeVal object for the transient value (i.e., results of evaluation of the stringlist by the function driver) and passes it on to its parent operator. If the Function Operator is not the top-most operator it passes on the NodeVal object to a higher-level operator at step 709. For instance, if a query includes nested functions, the output of one Function Operator may go to another Function Operator. Otherwise, if the parent operator is the top-most operator, the parent operator returns the results (e.g., to the SQL Query Engine) at step 710. For example, in queries such as "/bookstore/book/title/tolower( )", the top-most operator is the tolower( ) Function Operator that returns the results. The results are typically sent by the XML Query Engine to the SQL Query Engine. The SQL Engine may, in turn, send the results to a client (user). In typical operation, results generated by the XML Query Engine are sent to the SQL Query Engine which eventually sends them to the client (e.g., in response to an SQL query originally submitted by the client).

Class Definitions

Certain data structures and methods used in the currently preferred embodiment of the present invention will next be described to illustrate the operations of the present invention in greater detail.

Class NodeVal: Enumerations:

```
1: /*
2: Property is set by the context which creates NodeVal object. It
   remains unchanged throughout the life of the object.
3: */
4: enum NodeValObjectProperty
5: {
6:     NODEVAL_CONSTANT_VALUE = 0,
7:     NODEVAL_TRANSIENT_VALUE
8: };
```

Class NodeVal: Member variables:

```
1: NodeValObjectProperty _property;
2:
3: /*
4: For HETERO_TRANSIENT_VALUE, each transient value is also
associated with the persistent SybDom node. The following two fields
always contain equal number of entries, i.e., n values imply n nodes in
the treeNodeSet.
5: */
6: Dompp*      treeNodeSet;
7: StringList* transientVals;
8:
9: /*
10: If the property is NODEVAL_CONSTANT_VALUE, the above two
fields are empty and the following field contains user-supplied literal
constant.
11: */
12: XMLSTRING  constValue;
```

Class NodeVal: Member functions:

```
1: bool isEmpty( ) const;
2:
3: int size( ) const;
4:
5: const XMLSTRING getValue( ) const;
6:
```

-continued

```
 7: bool compare(const XSearchContext&   inputSc,
 8:           const XtreeCompOp&     compareOp
 9:           ) const;
10:
11: resultXml(WriteContext& result);
```

Class NodeToValOp: Enumerations

```
 1: enum NodeToValOpMode
 2: {
 3:      /*
 4:      ** Mode must be set by the constructor of the operator.
 5:      */
 6:      MODE_PRIMARY = 0,
 7:      MODE_PRIMARY_AGG,
 8:      MODE_SECONDARY
 9: };
10:
11: /*
12: ** States of an operator.
13: ** These states are mainly used to validate the
14: ** sequence of calls of the operator methods.
15: */
16: enum NodeToValOpState
17: {
18:      STATE_INITIAL = 0,
19:      STATE_OPENED,
20:      STATE_ACQUIRED,
21:      STATE_CONSUMED,
22:      STATE_EXHAUSTED,
23:      STATE_CLOSED
24: };
```

Class NodeToValOp: Member variables:

```
1: NodeToValOpState   _state;
2: NodeToValOpMode    _mode;
```

Class NodeToValOp: Member functions:

```
1: void open (ExecutionContext &ec);
2:
3: /*
4: Semantics of next is little involved. It checks if the child node is
a groupop. If it is it simply gets the primary and secondary of
child and sets primary and secondary dompp's in NodeVal object. Then
it iterates over secondary result-set to get and concatenate value of
each of them for the ValueSet field of NodeVal object. If the child
is anything else than a group it sets the primary dompp and gets
value of this dompp to be set in ValueSet.
5: */
6: bool next(ExecutionContext&   ec);
```

Class FunctionOp: Enumerations:

```
1: enum XqeFnOp
2: {
3: /*
4: WARNING:
5: Disastrous results should be expected if two functions get the same
integer value. When adding new functions make a new entry here. The
order of entries should be identical to enum XtreeFnOp.
6: */
7:     XQE_FUNC_INVALIDFN = 0,
8:     XQE_FUNC_TOLOWER,
9:     XQE_FUNC_TOUPPER,
10:    XQE_FUNC_CONCAT,
11:    XQE_FUNC_NORMALIZESPACE,
12:    XQE_FUNC_STRINGJOIN
13: };
14:
15: /*
16: Mode of an operator is a static property of the operator. It is set
at the creation time of the operator.
17: */
18: enum XqeFunctionOpMode
19: {
20:    XQE_FNMODE_INITIAL=0,
21:    XQE_FNMODE_RELATIVE,
22:    XQE_FNMODE_TOPLEVEL
23: };
24:
25: /*
26: On the other hand state changes throughout life of the operator.
27: */
28: enum FunctionOpState
29: {
30:    FNSTATE_INITIAL = 0,
31:    FNSTATE_OPENED,
32:    FNSTATE_ACQUIRED_CONSTANTS,
33:    FNSTATE_NO_CONSTANTS,
34:    FNSTATE_ALL_CONSTANTS,
35:    FNSTATE_ACQUIRED_CUR_SC,
36:    FNSTATE_EXHAUSTED,
37:    FNSTATE_LOCKSTEP,
38:    FNSTATE_ACQUIRED_ALLVALUES,
39:    FNSTATE_CONSUMED,
40:    FNSTATE_CLOSED,
41:    /*
42:    ** Following two states are interim states.
43:    ** used only in function _acquireCurSc( ).
44:    */
45:    FNSTATE_NO_SC_YET,
46:    FNSTATE_GOT_INTERIM_SC
47:    /* End interim states */
48: };
49:
50: enum FnChState
51: {
52:    FNCHILD_STATE_OPEN = 0,
53:    FNCHILD_STATE_CONSTANT,
54:    FNCHILD_STATE_ACQUIRED,
55:    FNCHILD_STATE_CONSUMED,
56:    FNCHILD_STATE_READY,
57:    FNCHILD_STATE_WAIT,
58:    FNCHILD_STATE_EXHAUSTED
59: };
```

Class FunctionOp: Member variables:

```
1: FunctionOpState    _state;
2: XqeFunctionOpMode  _mode;
3: XqeFnOp            _fnOp;
4: int                numChildren;
5: XMLSTRING*         constantBuf;
6: FnChState*         chState;
7: XSearchContext*    currentSc;
8: StringList         fnInputStrLst;
```

Class FunctionOp: Member functions:

```
1: /*
2: Following is the list of functions that mutate the state of this
operator. As they are mutators, they are defined as private members.
3: */
4:
5: /*
6: ** Buffer the values provided by all constant children.
7: */
```

```
 8:    void _acquireConstants(ExecutionContext& ec);
 9:
10:    /*
11:    Find out the search context that will be processed in the current
iteration.
12:    */
13:    void _acquireCurSc(ExecutionContext& ec);
14:
15:    /*
16:    ** Lock the children in READY or WAIT states
17:    */
18:    void _lockStep(ExecutionContext& ec);
19:
20:    /*
21:     ** Lock the children in READY or WAIT states
22:     */
23:    void _lockStep(ExecutionContext& ec);
24:
25:    /*
26:     ** Extract values from all constants and locked children.
27:     */
28:    void _acquireAllValues(ExecutionContext& ec);
29:
30: /*
31: ** Should operate on afnInStrLst.
32: */
33: XMLSTRING _evalFunction( );
```

New Components and the NodeVal API

The following discussion describes three components or aspects of the present invention in greater detail. These include the NodeToAtomVal operator, the Function Operator, and the change to the path processor layer to add an abstract NodeVal API. It should be noted, however, that in order to implement these components, other portions of the system of the present invention were also extended to support these three components. Accordingly, it should be understood that the following description of these components is for purposes of illustrating the methodology of the present invention in further detail and not for purposes of limitation.

NodeToAtomVal Operator

Much of the functionality of the NodeToAtomVal operator is embedded in the next( ) operator. Thus, the following discussion of the next( ) operator explains many of the details about the NodeToAtomVal operator. In the currently preferred embodiment, the next( ) operator has two modes: (1) MODE_PRIMARY, and (2) MODE_SECONDARY. In MODE_PRIMARY a child may have only a primary result, for instance the child is a simple scan. The following is an example document:

```
<bookstore>
  <book>
    <title>National</title>
    <author><fname>Joe</fname></author>
  </book>
  <book>
    <title>Trenton</title>
    <author>
      <fname>Mary</fname>
      <lname>Bob</lname>
    </author>
  </book>
</bookstore>
```

The following example illustrates the simple mode MODE_PRIMARY. For the query: "/bookstore/book/title/ tolower( )", the path "/bookstore/book/title" is scanned. On each next( ) call to the path scan one of the titles is returned.

Hence, on each next( ) call of NodeToValOp only one value is handled and associated with the node id of the corresponding 'title'.

In MODE_SECONDARY, when the child is a group operator it may have one primary result and all its children as a secondary result. Consider the example document below:

```
<bookstore>
  <book>
    <title>National</title>
    <author><fname>Joe Harder</fname></author>
  </book>
  <book>
    <title>Trenton</title>
    <author>Tom Black</author>
    <author>Joe Bob</author>
  </book>
</bookstore>
```

In the query: "/bookstore/book/tolower(author)", the element 'author' is present as argument to the function tolower( ). This means that for each book all authors should be returned and passed as argument to the string function. The standard tolower( ) function, as provided in the XPath functions and operators standard ("XQuery 1.0 and XPath 2.0 Functions and Operators", above), can take only one string argument at a time. Here, the function tolower( ) operates in the context of 'book'. A set of result 'author' is a secondary result returned by the underlying operator. In order to meet the requirement on the argument of the tolower( ) function, values of all the authors are concatenated. This query dictates that for each primary, all the secondaries are aggregated, the abstract object is built with a single node id and the aggregated value, and it is passed on to the higher-level operator in the query plan.

The following pseudocode steps explain these operations of the next( ) interface of the NodeToValue operator:

```
 1: bool
 2: NodeToValOp::next(ExecutionContext& ec)
 3: {
 4:
 5:    Step 1: If _state is STATE_OPENED
or _state == STATE_CONSUMED, get
result set and set the state to STATE_ACQUIRED
or STATE_EXHAUSTED.
 6:
 7:    Step 2: If _state is STATE_ACQUIRED,
 8:
 9:       Step 2.1: If _mode is MODE_PRIMARY,
save the value of primary result
in member variable, derivedVal.
10:         derivedVal = _childResult->getValue( );
11:
12:       Step 2.2: If _mode is MODE_SECONDARY,
append values of all the secondary nodes to member
variable derivedVal.
13:
14:       Step 2.3: Create a new instance of NodeVal object with
derivedVal as input and NODEVAL_TRANSIENT_VALUE as its
property. It also contains the node id of the primary node
associated with the derivedVal. Set the newly created instance
of NodeVal object as a result of this operator.
15: }
```

It should be noted that NodeToValOp is a unique operator in that none of the _childResult search contexts is passed as-is to the calling operators. Instead, a newly created NodeVal search context is sent to the calling operator.

Function Operator

In the currently preferred embodiment of the present invention, the Function Operator is implemented as a derived class which is based on NaryOp. As previously described, XPath queries with functions pose a number of challenges. Existing solutions that attempted to deal with these challenges typically used a number of different ad-hoc design approaches. However, these approaches impose restrictive limitations on the execution of functions. The present invention provides a solution to this problem by implementing a Function Operator including complex state-transition machinery (or automata). Importantly, the Function Operator provides the association or "link" between aggregate boundaries and aggregate values.

The Function Operator of the present invention not only goes through its own transitions but it also deals with the additional complexity introduced by the n-arity of functions. The n-arity of functions introduces a need for another nested state machine, which manages states of n-children of this operator. A Function Operator has one "_state" of its own and n "chStates" for the children (i.e., search contexts it has obtained from its children).

Figure 8:
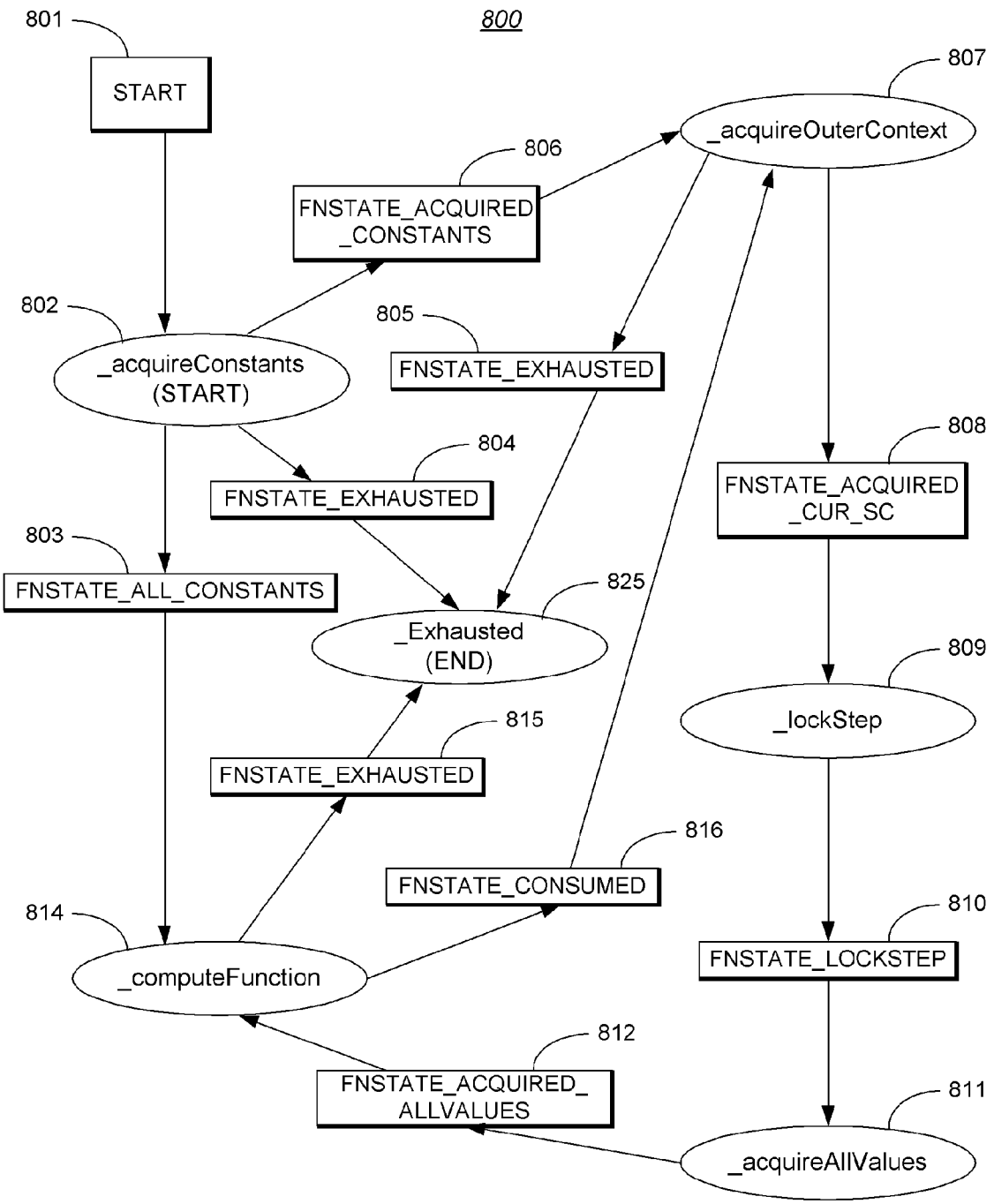
FIG. 8 is a flow diagram illustrating state transition for the Function Operator.

FIG. 8 is a flow diagram 800 illustrating state transition for the Function Operator. The state transitions of the Function Operator can be described as illustrated in the flow diagram 800 and the following discussion. Initially the state of a function is FNSTATE_OPEN. The next( ) call to the operator starts in the function _acquireConstants( ). As shown at FIG. 8, the termination of the state transitions of the Function Operator is marked as END (_Exhausted as provided at 825).

The open( ) operator: a) opens all the children; b) sets the _state=FNSTATE_OPEN; and c) for each child i, sets chState[i] FNCHILD_STATE_OPEN. The initial state of the operator (_state) at the START 801 is FNSTATE_OPEN. This means that the function has not yet consumed any value.

The next( ) call to the operator starts in the function _acquireConstants( ) as shown at 802 at FIG. 8. The _acquireConstants( ) function buffers values of constant children in constantBuf[ ] and marks corresponding chState[i] as FNCHILD_STATE_CONSTANT. As shown, the operator state may be exhausted (_state=FNSTATE_EXHAUSTED at 804) in the event that the function has no valid arguments. If this is the case, the function returns false and proceeds to the END (_Exhausted) 825.

If all children are constants, the _state is changed to FNSTATE_ALL_CONSTANTS as shown at 803 and proceeds to _computeFunction 814 as shown at FIG. 8. In other words, a number of steps are skipped in the next( ) interface in the event all children (i.e., all arguments to the function) are constants. If all of the arguments to the function are constants, the function can simply be evaluated as provided at _computeFunction 814. When the evaluation is complete, the operator state is marked to FNSTATE_EXHAUSTED as provided at 815. The function then terminates as shown at FIG. 8 by proceeding to the END (_Exhausted) 825. The above is an optimization so as to avoid unnecessary steps when all arguments to a function are constants.

The most typical situation is that some constants are found by the acquireConstants( ) function when it is called as shown at 802. In this event, the _state is marked to FNSTATE_ACQUIRED_CONSTANTS (as shown at 806) and proceeds to _acquireOuterContext 807 (which is also referred to as acquire current search context or "acquire_Cur_SC").

Figure 9A:
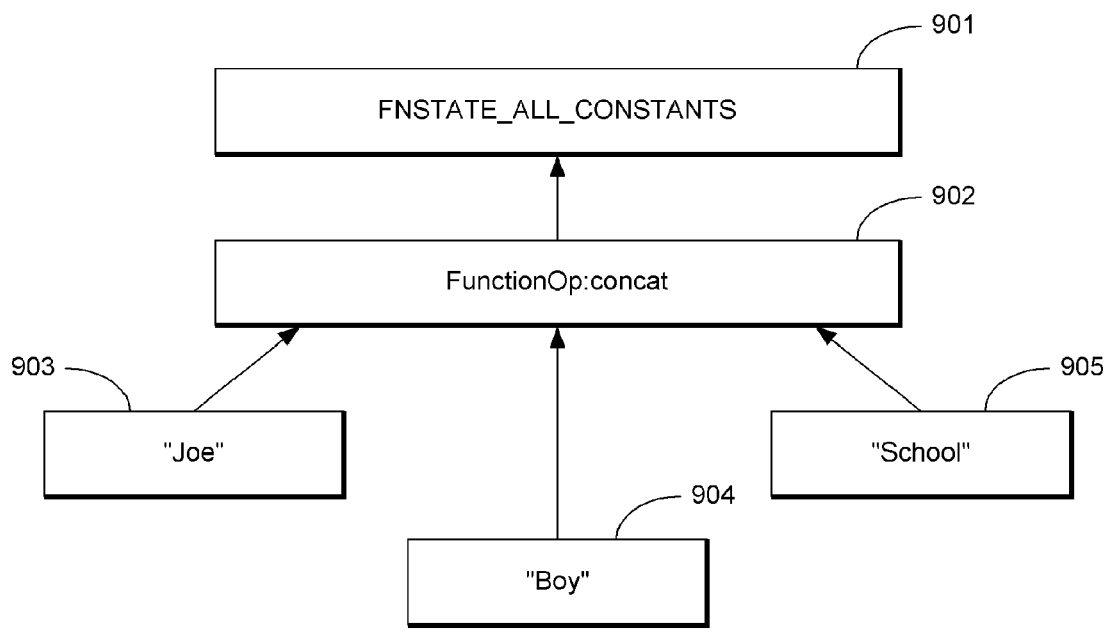
FIGS. 9A-B are block diagrams illustrating state transition in an _acquireConstants( ) routine of the Function Operator.
Figure 9B:
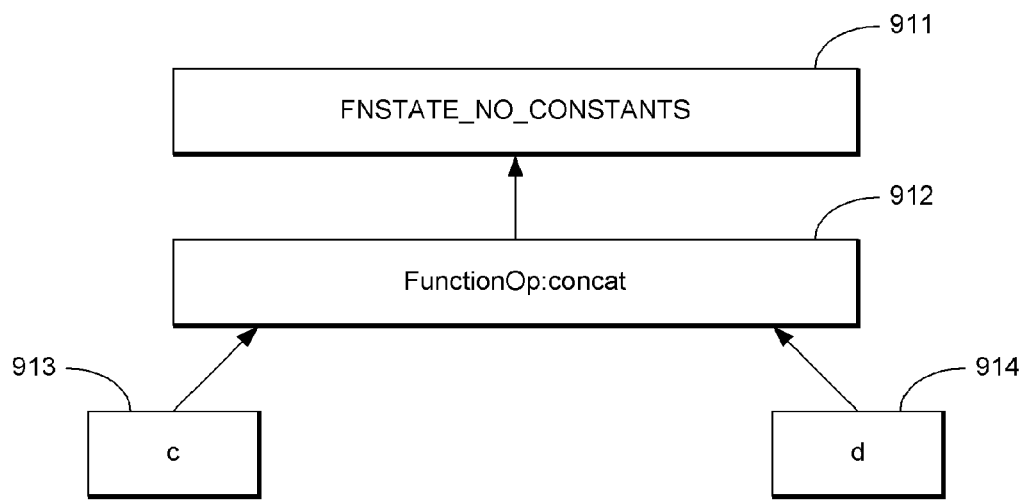

FIGS. 9A-B are block diagrams illustrating state transition in an _acquireConstants( ) routine of the Function Operator. FIG. 9A depicts the query: xmlextract('/a/b/concat("Joe", "Boy", "School"))', with an XML document: "<a><b><c>Fun Day</c></b></a>". As shown, the children of the concat function operator 902 are all constants ("Joe" 903, "Boy" 904, "School" 905). This leads to the state FNSTATE_ALL_CONSTANTS 901 as shown at FIG. 9A.

Alternatively, the query may be as follows: xmlextract('/a/b/concat(c,d)'), with an XML document as follows: "<a><b><c>Fun Day</c><d></d>in California!</b></a>". As shown at FIG. 9B, the children of the concat function operator 912 are elements c 913, d 914. This leads to state FNSTATE_NO_CONSTANTS 911 since there are non-empty elements specified in the query.

Another example is the following query: xmlextract('/a/b/concat(c,d)'), with an XML document "<a><b>in California!</b></a>". This leads to the FNSTATE_EXHAUSTED state, since there are no constants or the XML document does not have matching element entries.

Assuming that as a result of the _acquireConstants( ) routine the operator state is marked to FNSTATE_ACQUIRED_CONSTANTS (as illustrated at 806 at FIG. 8), the call to acquireOuterContext (_acquire_Cur_SC( ) at 807) acquires the current search context that should be processed in the present iteration. For example, the Function Operator may have multiple children: one corresponding to author first name, one corresponding to author last name, and so forth. All of these arguments or children (e.g., author names) are received in streams, and each of them needs to be associated with a given aggregation boundary (e.g., a particular book). For instance, in the query: /a/b/concat(c1, c2, ... cn), the outer context of concat is /a/b. When c? children are concatenated all of them must be children of the same b (e.g., the same book using the example of books in a bookstore). The system determines the first 'b' element (e.g., the first book) in document order that represents /a/b. It is not aware of any node identifiers.

Figure 10:
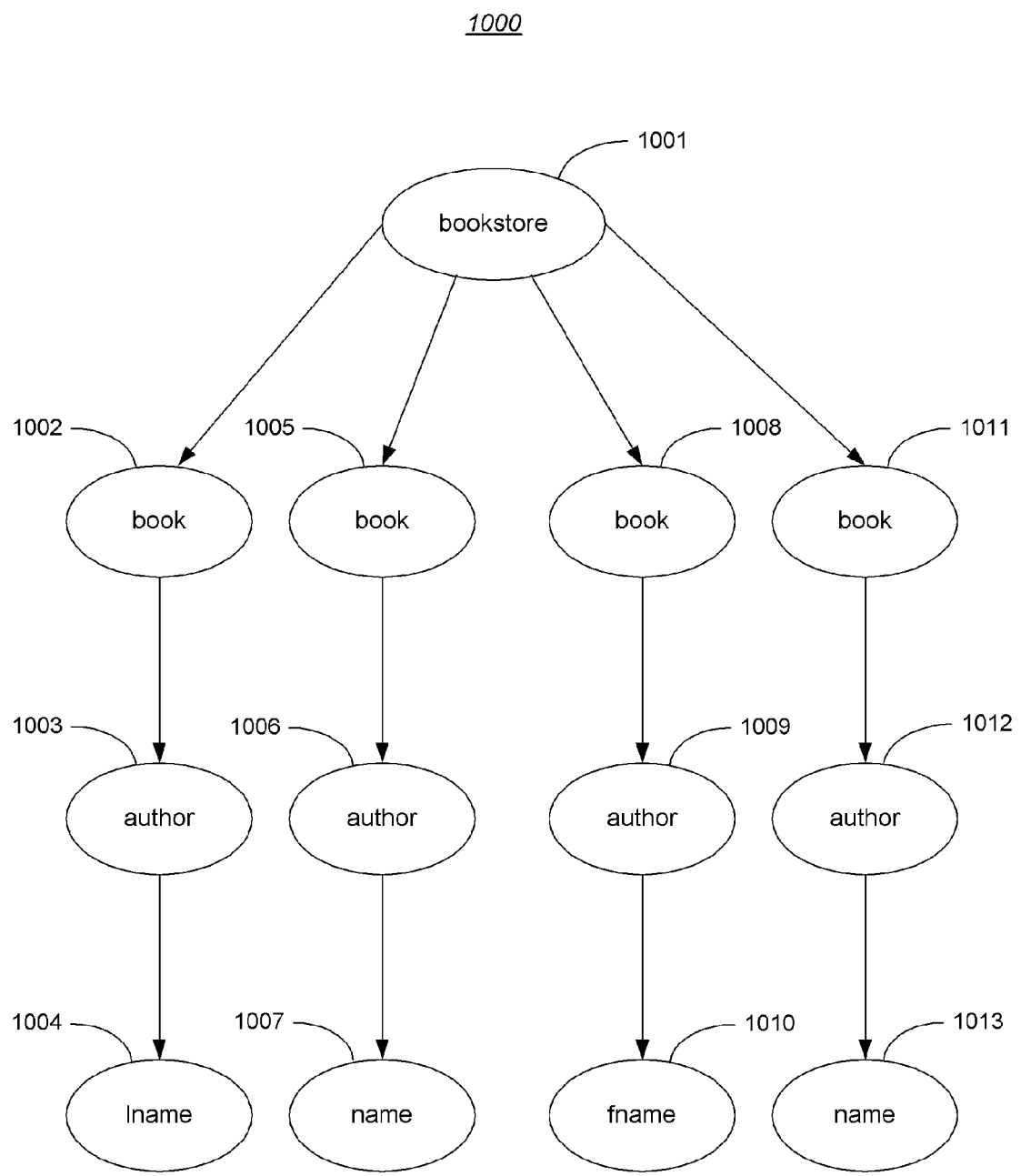
FIG. 10 is a high-level block diagram illustrating acquisition of a current search context.

FIG. 10 is a high-level block diagram illustrating acquisition of a current search context. This high-level block diagram 1000 illustrates why the current search context is acquired. Assume that an XML document for a bookstore is structured as shown at FIG. 10 and includes nodes 1001-1013. If the query "/bookstore/book/concat(author/lname, fname)" is run, the result should not be a concatenation of nodes 1004 and 1010 as these nodes relate to two different books (i.e., book 1002 and book 1008).

Since constants have been acquired, for all other children the next result needs to be obtained. If any child has no more results, its chState[i] is marked to FNCHILD_STATE_EXHAUSTED. The state of the function operator is marked as _state=FNSTATE_ACQUIRED_CUR_SC.

After the call to _acquire_Cur_SC as shown at 807, if the operator state is exhausted (_state=FNSTATE_EXHAUSTED as shown at 805 at FIG. 8), it returns false and proceeds to _Exhausted (END) 825. It should be noted that this code is executed only once during the life of the operator. All subsequent calls return as provided above.

On the other hand, if _state=FNSTATE_ACQUIRED_CUR_SC as illustrated at 808 after the call to _acquire_Cur_Sc, the _lockStep( ) function is called as provided at 809. At the point at which the _lockStep( ) function is applied, the current context 'b' (e.g., a particular book) has already been established. Each non-constant child is examined. If it belongs to the current context (e.g., relates to the particular book) its state is marked as chState[i]=FNCHILD_STATE_READY, and if it does not (e.g., relates to a different book) it is marked chState[i]=FNCHILD_STATE_WAIT. If the child was already waiting from a previous iteration it is checked to determine if it is now ready. If all the children are in FNCHILD_STATE_EXHAUSTED state, the state of the function operator (_state) is marked as FNSTATE_EXHAUSTED. Otherwise, it is marked _state=FNSTATE_LOCKSTEP.

If the _state is FNSTATE_LOCKSTEP as shown at 810 after the call to lockstep( ), an _accquireAllValues( ) function is called as provided at 811. At this point all constants are in place and children are marked as either ready, waiting, or exhausted. The _acquireAllValues( ) function assembles values of all constants and ready children in FnInputStrLst. All the ready children (i.e., those with chState=FNCHILD_STATE_READY) are marked as FNCHILD_STATE_CONSUMED. The state of the operator is marked _state=FNSTATE_ACQUIRED_ALLVALUES as provided at 812 at FIG. 8. The function is ready to be computed.

If the state of the operator (_state) is equal to FNSTATE_ALLVALUES after values are acquired, a _computeFunction( ) (also referred to as evalFunction) is called as provided at 814 to compute results of the Function Operator. The _evalFunction( ) invokes the driver from function utilities with FnInputStrLst. The outgoing search context is set. If the incoming state is FNSTATE_ACQUIRED_ALLVALUES, then _state=FNSTATE_CONSUMED. Otherwise if _state=FNSTATE_EXHAUSTED return true. As shown, if the _state is equal to FNSTATE_CONSUMED as shown at 816 at FIG. 8, the Function Operator may proceed to acquireOuterContext 807 (e.g., to go to the next book in the bookstore). When the function has evaluated all of the books, the state of the Function Operator (_state) transitions to exhausted (FNSTATE_EXHAUSTED) as shown at 815 and the function ends as provided at 825 at FIG. 8.

Enhancement to Path Processor Layer: NodeVal Object

The present invention also includes an enhancement to the path processor layer to include support for NodeVal objects. An abstract interface, "SearchContext", provides for encapsulating a set of node ids generated by the Store Layer during scans. The SearchContext provides basic services to utilize these node ids, such as adding a new node to the existing set, getting a subset of node ids specified by start and end node ids, testing for emptiness, size (i.e., number of tree nodes in the search context), getValue( ) of a singleton search context, comparing two search contexts with a given relational operator, and materializing result XML.

The SearchContext is materialized as a class Dompp. The present invention extends Dompp by adding a NodeVal API which provides support for NodeVal objects. In addition to the above-described functionality of Dompp the NodeVal API allows creation of search contexts that carry value strings to the higher-level operators. For string functions new operators generate string results. These strings are also associated with the path context in which they were computed. The present invention provides a solution to the need to represent values and associated node ids. A NodeVal object supports the functionality based upon the properties set at its creation time. Two of these properties are referred to as NODEVAL_CONSTANT_VALUE and NODEVAL_TRANSIENT_VALUE. The former property is used when a user-supplied literal is stored in the NodeVal object.

NodeVal object constructors accept either a store or a search context as an argument as shown in the following two constructors. The first constructor is as follows:

```
1: NodeVal::NodeVal(
2:     XStoreContext& storeContext,
3:     XMLSTRING& str,
4:     NodeValObjectProperty property
5:     )
6:     :transientVals(new StringList)
7:     ,_property(property)
8: {
9:     treeNodeSet = new Dompp(storeContext.getSybStore( ), SC_OID);
10:
11:     if(property == NODEVAL_CONSTANT_VALUE)
12:     {
13:         this->constValue = str;
14:     }
15:     else // NODEVAL_TRANSIENT_VALUE
16:     {
17:         this->transientVals->push_back(str);
18:     }
19: }
```

The second constructor is as follow:

```
1: NodeVal::NodeVal(
2:     XSearchContext&  sc,
3:     XMLSTRING&  str,
4:     NodeValObjectProperty  property
5:     )
6:     :transientVals(new StringList)
7:     ,_property(property)
8: {
9:     Dompp* dompp;
10:
11:     /*
12:     ** Extract the underlying Dompp, if sc represents
          NodeVal object.
13:     */
14:     if((&sc)->getSearchContextType( ) == XPP_NODEVAL
          OBJECT)
15:     {
16:         dompp = ((NodeVal object *) &sc)->treeNodeSet;
17:     }
18:     else if((&sc)->getSearchContextType( ) == XPP_DOMPP)
19:     {
20:         dompp = (Dompp *) ≻
21:     }
22:
23:     treeNodeSet = new Dompp(*(dompp));
24:
25:     if(property == NODEVAL_CONSTANT_VALUE)
26:     {
27:         this->constValue = str;
28:     }
29:     else // NODEVAL_TRANSIENT_VALUE
30:     {
31:         this->transientVals->push_back(str);
32:     }
33: }
```

The merge( ) interface of the NodeVal object checks if the incoming search context is of type NODEVAL. If it is of this type, its underlying dompp is extracted, its value is added to 'this', and the node sets merged.

A SearchContext of the NodeVal object type is returned only when the result of the query is a set of strings. In all other cases the result is Dompp. The semantics of certain functions in the Dompp (Path Processor layer) are described below in more detail.

NodeVal object::is Empty( ): If this object contains a user-supplied constant value the return is always false. Even the presence of an empty constant means that the search context is not empty. However, if this object contains a transient value (i.e., _property=NODEVAL_TRANSIENT_VALUE) the object may have zero or one transient value. If there is one value then there must be one node associated with it. The is Empty( ) routine of the underlying Dompp is invoked to verify whether it does or does not have any node.

NodeVal object::size( ): When this object contains a transient value there is always an associated Dompp node. The size of this object is simply the number of nodes (or transient values) multiplied by two. When the object contains a constant value the size of a NodeVal object with _property=NODEVAL_CONSTANT is always unity since it represents only one (user-supplied) constant literal.

NodeVal::getValue( ): Conceptually this function makes a major deviation from Dompp. In Dompp this function extracts the persistent value of the node (i.e., a concatenation of all the text children of a node). In a NodeVal object it returns a value depending upon its property. In the case of constants there is only one string that needs to be returned. For example:

```
1: if(this->_property == NODEVAL_CONSTANT_VALUE)
2: {
3:   str = constValue;
4: }
```

In the case of transient values there could be more than one value in the stringlist transientVals, consequently in the present invention it returns all these transient values as a single string as shown below.

```
1: if(this->_property == NODEVAL_TRANSIENT_VALUE)
2: {
3:    StringIterator iter;
4:    for ( iter = transientVals->begin( );
5:       iter != transientVals->end( );
6:       iter++)
7:    {
8:       str.append(*iter);
9:    }
10: }
11: return (str);
```

NodeVal::compare(const XSearchContext& inputSc, const XtreeCompOp& compareOp) const: This routine compares the input SearchContext (inputSc) with this->SearchContext according to the comparison operator "compareOp", as illustrated below.

```
1: ASSERT(this->_property == NODEVAL_TRANSIENT_VALUE);
2: if((&inputSc)->getSearchContextType( ) == NODEVAL)
3: {
4:    retVal = this->treeNodeSet->compare(
5:       *(((NodeVal object *) &(inputSc))->treeNodeSet),
6:       compareOp
7:    );
8: }
9: else // if((&inputSc)->getSearchContextType( ) == DOMPP)
10: {
11:    retVal = this->treeNodeSet->compare(inputSc, compareOp);
12: }
13: return retVal;
```

Interaction Among Components

The following discussion will describe the interaction of components of the present invention in handling sample query received by the XML Engine. This discussion uses the following query as an example:
select xmlextract("/a/b/tolower(c))", with the following XML document: "<a>California Street<b>San Francisco<c>CA</c></b></a>".

An execution plan generated in the currently preferred embodiment of the present invention based on the above query is as follows:

```
FUNCTION OPERATOR: 0x7b858710
FUNCTION NAME: TOLOWER
PROJECTION in 3
----------------------------------
   NODE TO ATOM VALUE OPERATION
   MODE_SECONDARY mode.PROJECTION in 8
   ----------------------------------
      GROUP OPERATOR: 0x7b859090
      PRIMARY in 6
      SECONDARY in 7
      LH Result in 5
      RH Result in 4
      ----------------------------------
         SCAN OPERATOR: 0x7b858c50
         SCAN OPERATION on /a/b
         PROJECTION in 5
         ----------------------------------
         SCAN OPERATOR: 0x7b858a90
         SCAN OPERATION on /a/b/c
         PROJECTION in 4
```

The process of handling the above query commences with the parsing of the query by the XPath parser. The XPath parser converts the XPath portion of the query /a/b/tolower(c) into a tree form for in-memory representation. This tree (query tree) is simply an "as is" representation of the query in the engine.

Next, a normalization component goes through the query tree and raises exceptions if there are any semantic ambiguities. It outputs a normalized query tree. This normalized tree then passes through the optimizer, which generates a set of operators called either a query plan or execution plan ("plan") based on the normalized query tree. All the operators in the execution plan are connected to each other hierarchically such that the results of the lower-level operator are fed as input to the higher-level operator. As an example, in the execution plan shown above the output (o/p) of the "GROUP" operator is fed to the node to atomic value (Node to Atom Value) operator. The "GROUP" is also called a "child" of the Node to Atom Value operator. The GROUP operator has two children. Both of these children are simple path scans (/a/b and /a/b/c). Path scans simply produce node ids and pass them to the GROUP operator as Dompp instances. The GROUP operator performs some operations and passes its results on to the Node to Atom Value operator.

As the execution plan shows, the Node to Atom Value operator is in MODE_SECONDARY mode. This means that this node to atomic value operator aggregates values of all the c's in each b and passes the aggregated value with the node id of 'b' to the Function Operator. The Function Operator simply extracts values of all the arguments and constructs a stringlist. This stringlist is later passed to a function driver or a function utility, which actually evaluates the function on the values in the stringlist. The result of the query is simply 'ca'.

Examples of Typical Queries and their Plans

To further illustrate the operations of the present invention, the following will describe several typical queries and the execution plans generated based on these queries. The output of the queries for a given XML document will also be described.

Query 1: select xmlextract("/a/b/c/tolower( )", with the following XML document: "<a>California Street<b>San Francisco<c>CA</c></b></a>".

Query 1 output: ca

Query 1 plan:

```
FUNCTION OPERATOR: 0x7b80e470
FUNCTION NAME: TOLOWER
PROJECTION in 4
```

```
                NODE TO ATOM VALUE OPERATION
                MODE_PRIMARY mode.    PROJECTION in 6
                --------------------------------
                        SCAN OPERATOR: 0x7b80e7b0
                        SCAN OPERATION on /a/b/c
                        PROJECTION in 5
```

Query 2: select xmlextract("/a/b/tolower(c)", with the following XML document: "<a>California Street<b>San Francisco<c>CA</c></b></a>".

Query 2 output: ca

Query 2 plan:

```
FUNCTION OPERATOR: 0x7b858710
FUNCTION NAME: TOLOWER
PROJECTION in 3
--------------------------------
        NODE TO ATOM VALUE OPERATION
        MODE_SECONDARY mode.PROJECTION in 8
        --------------------------------
                GROUP OPERATOR: 0x7b859090
                PRIMARY in 6
                SECONDARY in 7
                LH Result in 5
                RH Result in 4
                --------------------------------
                        SCAN OPERATOR: 0x7b858c50
                        SCAN OPERATION on /a/b
                        PROJECTION in 5
                --------------------------------
                        SCAN OPERATOR: 0x7b858a90
                        SCAN OPERATION on /a/b/c
                        PROJECTION in 4
```

Query 3: select xmlextract("/a/b[tolower(c)='ca']", with the following XML document: "<a>California Street<b>San Francisco<c>CA</c></b></a>".

Query 3 output: <b>San Francisco<c>CA</c></b>

Query 3 plan:

```
GROUP OPERATOR: 0x7b78f0d0
PRIMARY in 12
SECONDARY in 13
LH Result in 11
RH Result in 10
--------------------------------
SCAN OPERATOR: 0x7b78e190
SCAN OPERATION on /a/b
PROJECTION in 11
--------------------------------
COMPARISON OPERATOR: 0x7b78e710
OPERATOR is =
RHS is ca
LH in 4
PROJECTION in 10
--------------------------------
        FUNCTION OPERATOR: 0x7b78e4d0
        FUNCTION NAME: TOLOWER
        PROJECTION in 4
        --------------------------------
                NODE TO ATOM VALUE OPERATION
                MODE_SECONDARY mode.       PROJECTION in 9
                --------------------------------
                        GROUP OPERATOR: 0x7b78ee50
                        PRIMARY in 7
                        SECONDARY in 8
                        LH Result in 6
                        RH Result in 5
```

```
                                SCAN OPERATOR: 0x7b78ea10
                                SCAN OPERATION on /a/b
                                PROJECTION in 6
                                --------------------------------
                                SCAN OPERATOR: 0x7b78e850
                                SCAN OPERATION on /a/b/c
                                PROJECTION in 5
                --------------------------------
INVALID OPERATION
```

Query 4: select xmlextract("/a/b/concat(c1, c2)", with the following XML document: "<a>California Street<b>San Francisco<c1>CA</c1><c2>USA</c2></b></a>".

Query 4 output: CAUSA

Query 4 plan:

```
FUNCTION OPERATOR: 0x7b7d6390
FUNCTION NAME: CONCAT
PROJECTION in 3
--------------------------------
        NODE TO ATOM VALUE OPERATION
        MODE_SECONDARY mode.PROJECTION in 8
        --------------------------------
                GROUP OPERATOR: 0x7b7d6d10
                PRIMARY in 6
                SECONDARY in 7
                LH Result in 5
                RH Result in 4
                --------------------------------
                        SCAN OPERATOR: 0x7b7d68d0
                        SCAN OPERATION on /a/b
                        PROJECTION in 5
                        --------------------------------
                        SCAN OPERATOR: 0x7b7d6710
                        SCAN OPERATION on /a/b/c1
                        PROJECTION in 4
        --------------------------------
        NODE TO ATOM VALUE OPERATION
        MODE_SECONDARY mode.PROJECTION in 13
        --------------------------------
                GROUP OPERATOR: 0x7b7d7610
                PRIMARY in 11
                SECONDARY in 12
                LH Result in 10
                RH Result in 9
                --------------------------------
                        SCAN OPERATOR: 0x7b7d71d0
                        SCAN OPERATION on /a/b
                        PROJECTION in 10
                        --------------------------------
                        SCAN OPERATOR: 0x7b7d7010
                        SCAN OPERATION on /a/b/c2
                        PROJECTION in 9
```

Query 5: select xmlextract("/a/b/concat(c1, '%%%', c2)", with the following XML document: "<a>California Street<b>San Francisco<c1>CA</c1><c2>USA</c2></b></a>".

Query 5 output: CA %%% USA

Query 5 plan:

```
FUNCTION OPERATOR: 0x7b81e550
FUNCTION NAME: CONCAT
PROJECTION in 3
--------------------------------
        NODE TO ATOM VALUE OPERATION
        MODE_SECONDARY mode.PROJECTION in 8
        --------------------------------
                GROUP OPERATOR: 0x7b81eed0
                PRIMARY in 6
                SECONDARY in 7
```

```
            LH Result in 5
            RH Result in 4
            ----------------------------------
               SCAN OPERATOR: 0x7b81ea90
               SCAN OPERATION on /a/b
               PROJECTION in 5
            ----------------------------------
               SCAN OPERATOR: 0x7b81e8d0
               SCAN OPERATION on /a/b/c1
               PROJECTION in 4
   ----------------------------------
   CONSTANT OPERATION
   Value: %%%
   ----------------------------------
   NODE TO ATOM VALUE OPERATION
   MODE_SECONDARY mode.PROJECTION in 14
   ----------------------------------
      GROUP OPERATOR: 0x7b81f870
      PRIMARY in 12
      SECONDARY in 13
      LH Result in 11
      RH Result in 10
      ----------------------------------
         SCAN OPERATOR: 0x7b81f430
         SCAN OPERATION on /a/b
         PROJECTION in 11
         ----------------------------------
         SCAN OPERATOR: 0x7b81f270
         SCAN OPERATION on /a/b/c2
         PROJECTION in 10
```

Query 6: select xmlextract("/a/b/concat(c1, '%%%', tolower(c2))", with the following XML document: "<a>California Street<b>San Francisco<c1>CA</c1><c2>USA</c2></b></a>".

Query 6 output: CA %%% usa

Query 6 plan:

```
FUNCTION OPERATOR: 0x7b86e7b0
FUNCTION NAME: CONCAT
PROJECTION in 3
   ----------------------------------
   NODE TO ATOM VALUE OPERATION
   MODE_SECONDARY mode.PROJECTION in 8
   ----------------------------------
      GROUP OPERATOR: 0x7b86f130
      PRIMARY in 6
      SECONDARY in 7
      LH Result in 5
      RH Result in 4
      ----------------------------------
         SCAN OPERATOR: 0x7b86ecf0
         SCAN OPERATION on /a/b
         PROJECTION in 5
         ----------------------------------
         SCAN OPERATOR: 0x7b86eb30
         SCAN OPERATION on /a/b/c1
         PROJECTION in 4
   ----------------------------------
   CONSTANT OPERATION
   Value: %%%
   ----------------------------------
   FUNCTION OPERATOR: 0x7b86f490
   FUNCTION NAME: TOLOWER
   PROJECTION in 10
      ----------------------------------
      NODE TO ATOM VALUE OPERATION
      MODE_SECONDARY mode.   PROJECTION in 15
      ----------------------------------
         GROUP OPERATOR: 0x7b86fe10
         PRIMARY in 13
         SECONDARY in 14
         LH Result in 12
         RH Result in 11
         ----------------------------------
            SCAN OPERATOR: 0x7b86f9d0
            SCAN OPERATION on /a/b
            PROJECTION in 12
            ----------------------------------
            SCAN OPERATOR: 0x7b86f810
            SCAN OPERATION on /a/b/c2
            PROJECTION in 11
```

While the invention is described in some detail with specific reference to a single-preferred embodiment and certain alternatives, there is no intent to limit the invention to that particular embodiment or those specific alternatives. For instance, those skilled in the art will appreciate that modifications may be made to the preferred embodiment without departing from the teachings of the present invention.

What is claimed is:

1. A method for executing a function in an XPath-based query requesting data from a markup language document stored in a database, the markup language document organized hierarchically into nodes, the method comprising:
receiving the XPath-based query requesting data from the markup language document, the XPath-based query including an XPath built-in function that operates within a particular context of the markup language document during execution of the XPath-based query;
during execution of the XPath-based query:
determining nodes of the markup language document satisfying the XPath-based query, wherein determinina nodes the markup language document satisfying the XPath-based query includes determining node identifiers,
deriving values of said nodes of the markup language document, and
executing the XPath built-in function with said derived values and said nodes of the markup language document.

2. The method of claim 1, wherein the markup language comprises Extensible Markup Language (XML).

3. The method of claim 1, wherein the query includes an XPath-based expression.

4. The method of claim 3, wherein said XPath-based expression comprises an XPath expression.

5. The method of claim 3, wherein said determining step includes determining nodes of the markup language document based, at least in part, on paths in the XPath-based expression.

6. The method of claim 3, wherein said XPath-based expression is included in a Structured Query Language (SQL) query.

7. The method of claim 1, wherein said determining step includes generating a plan for obtaining data requested by the query.

8. The method of claim 7, wherein the plan includes operators which are connected hierarchically such that results of a lower-level operator are input to a higher-level operator.

9. The method of claim 8, wherein the plan includes an operator representing the function.

10. The method of claim 9, wherein the plan includes an operator for deriving a value associated with a node of the markup language document.

11. The method of claim 10, wherein said determining step includes placing an operator for deriving a value below the operator representing the function in the plan so as to input derived values into the function.

12. The method of claim 10, wherein said deriving step includes deriving values of said nodes using said operator for deriving a value.

13. The method of claim 1, wherein said derived values comprise transient values generated during execution of the query.

14. The method of claim 1, further comprising: associating said derived values with nodes of the markup language document.

15. The method of claim 14, wherein said associating step includes associating a derived value with one or more nodes of the markup language document.

16. The method of claim 14, wherein said associating step includes aggregating derived values of a plurality of nodes satisfying a portion of the query.

17. The method of claim 16, wherein said aggregating step includes concatenating string values of said plurality of nodes.

18. The method of claim 16, wherein said aggregating step includes synchronizing aggregated derived values with nodes of the markup language document.

19. The method of claim 18, wherein said aggregating step includes using a state transition mechanism for synchronization of aggregation boundaries.

20. The method of claim 19, wherein said state transition mechanism synchronizes aggregated derived values and user-supplied literals.

21. The method of claim 19, wherein said state transition mechanism synchronizes nodes without associated values.

22. The method of claim 16, wherein said associating step includes marshalling arguments from aggregated derived values at aggregation boundaries for input to the function.

23. The method of claim 22, wherein said executing step includes invoking the function with arvuments generated from said aggregated derived values.

24. The method of claim 14, wherein said associating step includes associating user supplied literal values, derived values, and nodes of the markup language document.

25. The method of claim 14, wherein said associating step includes associating values with persistent nodes of the markup language document based on unique identifiers assigned to nodes of the markup language document.

26. The method of claim 1, further comprising:
returning results of execution of the function, including returning results of the XPath built-in function when the XPath built-in function is a top-most operator.

27. A non-transitory computer-readable medium having processor-executable instructions for performing the method of claim 1.

28. The method of claim 1, further comprising:
downloading a set of computer-executable instructions for performing the method of claim 1.

29. A system for executing a function included in an XPath-based query requesting data from a markup language document stored in a database, the markup language document organized hierarchically into nodes, the system comprising:
a computer having at least a processor and a memory;
a compiler module, operating on said computer, for generating a plan for identifying nodes of the markup language document satisfying the XPath- based query, the XPath-based query including a an XPath-based built-in function that operates within a particular context of the markup language document during execution of the XPath-based query; and
an execution module, operating on said computer, for executing the plan to identify nodes of the markup language document satisfying the XPath-based query, obtaining values corresponding to identified nodes of the markup language document, associating said values with the identified nodes, and executing the XPath-based built-in function included in the XPath-based query with said values and identified nodes.

30. The system of claim 29, wherein the markup language comprises Extensible Markup Language (XML).

31. The system of claim 29, wherein the query includes an XPath query expression.

32. The system of claim 31, wherein said XPath query expression is included in a Structured Query Language (SQL) query.

33. The system of claim 29, wherein said execution module aggregates values when multiple nodes satisfy a query expression.

34. The system of claim 33, wherein said execution module marshals said values at aggregation boundaries.

35. The system of claim 34, wherein said execution module determines aggregation boundaries based on outer path context.

36. The system of claim 34, wherein said execution module includes a state transition mechanism for synchronizing aggregation boundaries.

37. The system of claim 36, wherein said state transition mechanism synchronizes aggregation boundaries of a node without an associated value.

38. The system of claim 36, wherein said state transition mechanism synchronizes aggregation boundaries of nodes from different subtrees in the markup language document.

39. The system of claim 29, wherein the compiler module parses the query to create an in-memory representation of the query in tree form.

40. The system of claim 29, wherein said compiler module generates an execution plan for execution of the query.

41. The system of claim 40, wherein the execution plan includes operators which are connected hierarchically such that results of a lower-level operator are input to a higher-level operator.

42. The system of claim 41, wherein the execution plan includes an operator for obtaining a value associated with a node of the markup language document.

43. The system of claim 42, wherein the execution plan includes an operator for executing a function included in the query.

44. The system of claim 29, wherein each node of the markup language document stored in the database is identified by a unique identifier.

45. The system of claim 29, wherein a node of the markup language document corresponds to an element of the markup language document stored in the database.

46. The system of claim 29, wherein said execution module associates a value with one or more nodes of the markup language document.

47. The system of claim 29, wherein said execution module performs a string function.

48. The system of claim 47, wherein said string function comprises a selected one or more of a tolower( )function, a toupper( )function, a normalize-space( ) function, and a concat( )function.

49. The system of claim 29, wherein said execution module aggregates values of a plurality of identified nodes.

50. The system of claim 49, wherein said execution module synchronizes aggregate values with nodes of the markup language document.

51. The system of claim 50, wherein said execution module includes a state transition mechanism for synchronization of aggregation boundaries.

52. The system of claim 29, further comprising:
a module for transforming a markup language document comprising a plurality of elements for storage in a database.

53. The system of claim 52, wherein the module for transforming assigns a unique identifier to each element of the markup language document.

54. The system of claim 53, wherein the unique identifier is based on order each element appears in the markup language document.

55. The system of claim 29, wherein the execution module returns results in order in which elements appear in the markup language document.

56. The system of claim 29, wherein said compiler module generates a plan for identifying nodes of the markup language document satisfying the query based on paths in the query.

57. The system of claim 56, wherein said execution module performs aggregation on said paths.

58. The system of claim 29, wherein said execution module associates said values with user supplied literal values for executing the function.

59. The system of claim 29, wherein the execution module returns results of execution of the function.

60. In a database system, a method for executing an XPath built-in function in an XPath-based query requesting data from an Extensible Markup Language (XML) document, the method comprising:
receiving the XPath-based query requesting data from an XML document, the XPath-based query including an XPath built-in function to be executed on data from an XML document which includes a plurality of hierarchically arranged elements, said XPath built-in function operating within a particular context of the XML document during execution of the XPath-based query;
during execution of the XPath-based query:
determining elements of the XML document satisfying the XPath- based query,
obtaining values of said elements of the XML document, associating said values with elements of the XML document, and
executing the XPath built-in function with said values and associated elements.

61. The method of claim 60, wherein the query includes an XPath query expression.

62. The method of claim 61, wherein said XPath query expression is included in a Structured Query Language (SQL) query.

63. The method of claim 60, wherein said obtaining step includes aggregating values of a plurality of elements satisfying a portion of the query.

64. The method of claim 63, wherein said associating step includes marshalling arguments to the function at aggregation boundaries.

65. The method of claim 64, wherein said aggregation boundaries are determined based on outer path context.

66. The method of claim 64, wherein said associating step includes using a state transition mechanism for synchronizing aggregation boundaries.

67. The method of claim 66, wherein said state transition mechanism synchronizes aggregation boundaries of an element without an associated value.

68. The method of claim 66, wherein said state transition mechanism synchronizes aggregation boundaries for elements from different subtrees in the XML document.

69. The method of claim 60, wherein said determining step includes parsing the query to create an in-memory representation of the query in tree form.

70. The method of claim 60, wherein said determining step includes generating an execution plan for execution of the query.

71. The method of claim 70, wherein said execution plan includes operators connected hierarchically such that results of a lower-level operator are input to a higher-level operator.

72. The method of claim 70, wherein said execution plan includes an operator for executing the XPath built-in function.

73. The method of claim 72, wherein said operator for executing the XPath built-in function performs a string function.

74. The method of claim 73, wherein said string function comprises one or more of a tolowerO function, a toupper( )function, a normalize-space( )function, and a concat( )function.

75. The method of claim 70, wherein said execution plan includes an operator for obtaining a value for an element of the XML document.

76. The method of claim 75, wherein said obtaining step includes obtaining a value of an element of the XML document using said operator for obtaining a value.

77. The method of claim 60, wherein said executing step includes invoking the function operator with said values and user supplied literal values.

78. The method of claim 60, further comprising: returning results of execution of the XPath built-in function.

79. The method of claim 60, further comprising:
downloading a set of computer-executable instructions for performing the method of claim 60.

80. In a database system, a method for executing an XPath built-in function included in an XPath-based query requesting data from an XML document organized hierarchically into nodes, the method comprising:
generating an execution plan for obtaining data requested by the XPath-based query from an XML document, the execution plan including an operator for performing the XPath built-in function included in the XPath-based query, said XPath built-in function operating within a particular context of the XML document during execution of the XPath-based query;
inserting an operator for obtaining values corresponding to nodes of the XML document into the execution plan;
during execution of the XPath-based query:
identifying nodes of the XML document satisfying the XPath-based query based on the execution plan,
deriving values from identified nodes of the XML document using the operator for obtaining values, and
invoking the operator for performing the XPath built-in function with the values derived from the identified nodes of the XML document.

81. The method of claim 80, wherein said deriving step includes aggregating derived values of a plurality of identified nodes.

82. The method of claim 81, wherein said aggregating step includes synchronizing aggregation boundaries so as to associate values with particular nodes of the XML document.

83. The method of claim 82, wherein said aggregating step includes using a state transition mechanism for synchronization of aggregation boundaries.

84. The method of claim 83, wherein said state transition mechanism synchronizes aggregated derived values and user-supplied literals.

85. The method of claim 80, wherein said inserting step includes inserting a physical query plan operator for associating derived values with nodes of the XML document.

86. The method of claim 80, wherein said invoking step includes invoking the operator for performing the XPath-based function with user supplied literal values and the values derived from identified nodes of the XML document.

87. The method of claim 80, wherein said deriving step includes deriving values associated with persistent nodes of the XML document based on unique identifiers assigned to nodes of the XML document.

88. A non-transitory computer-readable medium having processor-executable instructions for performing the method of claim 80.

89. The method of claim 80, further comprising:
   downloading a set of computer-executable instructions for performing the method of claim 80.

90. The method of claim 1, wherein executing the XPath built-in function with said derived values and said nodes of the markup language document further comprises:
   passing said derived values to a higher level operator when the XPath built-in function is not a top-most operator.

* * * * *